May 22, 1945.

W. L. SHAFFER 2,376,513

CONTROL APPARATUS

Filed Oct. 9, 1942

INVENTOR.
WILLIAM L. SHAFFER.
BY
*C. B. Spangenberg*
ATTORNEY.

May 22, 1945.  W. L. SHAFFER  2,376,513
CONTROL APPARATUS
Filed Oct. 9, 1942  3 Sheets-Sheet 2

INVENTOR.
WILLIAM L. SHAFFER.
BY
E B Spangenberg
ATTORNEY.

May 22, 1945.　　W. L. SHAFFER　　2,376,513
CONTROL APPARATUS
Filed Oct. 9, 1942　　3 Sheets-Sheet 3

INVENTOR.
WILLIAM L. SHAFFER.
BY
*C. B. Spangenberg*
ATTORNEY.

Patented May 22, 1945

2,376,513

UNITED STATES PATENT OFFICE 2,376,513

CONTROL APPARATUS

William L. Shaffer, Philadelphia, Pa., assignor to The Brown Instrument Company, Philadelphia, Pa., a corporation of Pennsylvania Application October 9, 1942, Serial No. 461,413

19 Claims. (Cl. 172—239)

My present invention relates to electrical control apparatus and in particular to electrical control apparatus designed to effect suitable corrective adjustments in the value of a quantity being controlled, on departure of the controlled quantity from a predetermined value, without creating an objectionable tendency to unstable control or hunting.

It is a general object of my invention to provide electrical control apparatus which is capable of producing a corrective adjustment in a controlling medium, upon change in the value of a variable quantity under control, to restore the latter to the value desired in the shortest time possible while avoiding the tendency to hunting.

A more specific object of my invention is to provide such electrical control apparatus utilizing an alternating current control network and embodying physically stationary means for compensating for variations in the characteristics of the quantity being controlled.

It is a particular object of the invention to provide such apparatus in which the compensation for variations in the characteristics of the quantity being controlled is effected at a rate proportional to the extent of departure of the quantity from the desired value, and moreover, is uniform for a constant departure.

A further and more specific object of my invention is to provide such electrical control apparatus utilizing an alternating current control network and embodying physically stationary means for producing a disproportionately strong corrective effect in the supply of the controlling medium during the initial stages of a departure of the quantity being controlled from the desired value while avoiding the tendency to hunting which would ordinarily result from such strong initial corrective effect.

Electrically operated controllers embodying the features of my invention may take widely different forms and are adapted for use for many different purposes. In general, however, they may be used whenever it is desirable to produce a control effect in response to a change in a control condition or quantity, such for example, as temperature, pressure, flow, liquid level, etc. which tends to vary as a result of the control effect produced.

In accordance with the present invention, suitable provisions are made to prevent variations in the quantity being controlled. Such variations may be due to changes in the effect of the controlling medium or agent, to changes in the characteristics or amount of the quantity being controlled, or to any other variable conditions. On a change in an operating condition, such a change in the B. t. u. content of the fuel supplied to a furnace or to a change in the furnace load, the furnace temperature will tend to vary but due to the heat inertia of the furnace, the change in the operating condition may have been in existence for some time before it results in a temperature change which is detected by the apparatus utilized for the purpose of maintaining the furnace temperature at a desired value. When thereafter a correction in the amount of fuel supplied to the furnace is made by the control apparatus, such correction will not be effective immediately to restore the desired furnace temperature. This lag also is due to the heat inertia of the furnace. In addition, if a sufficiently large correction is made to restore the furnace temperature to the desired value within a reasonably short time and that correction is maintained until that value is reached, the furnace temperature will tend to overshoot the desired value and subsequent corrective adjustments will result in hunting or oscillation of the furnace temperature about that value.

In its broad aspects, therefore, a primary object of my invention is to provide electrical control apparatus which is adapted to prevent such hunting or oscillation and is capable of effecting control or regulation at an even given value.

The preferred form of my invention includes a low impedance alternating current control network and also includes provisions for effecting a so-called "resetting" or compensating adjustment whereby on a change in an operating condition, such for example, as a change in the load on a furnace which is being controlled to minimize variations in the furnace temperature, the tendency of the furnace load or other operating condition change to increase or decrease the furnace temperature or other controlling condition may be neutralized.

The preferred form of the invention also includes means for effecting an adjustment in the rate of reset whereby on a change in the furnace load or another analogous operating condition, the compensating adjustment necessary to the maintenance of the approximately constant value of the furnace temperature or other quantity under control may be varied to the end that the time required for full compensation of the operating condition may be reduced to the practical minimum possible without risk of objectionable hunting.

The preferred embodiment of my invention also includes provisions for effecting a relatively large initial corrective adjustment in the amount of the controlling medium supplied to maintain the desired condition and thereafter before the condition has returned to that desired value removing the initially large corrective adjustment whereby the tendency to hunting which would ordinarily result from such large initial corrective adjustment is avoided.

In its preferred form, my invention also includes provisions for readily effecting a so-called throttling range adjustment whereby the extent to which the fuel valve or the regulator is adjusted in response to a given change in the furnace temperature or other control quantity may be varied.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
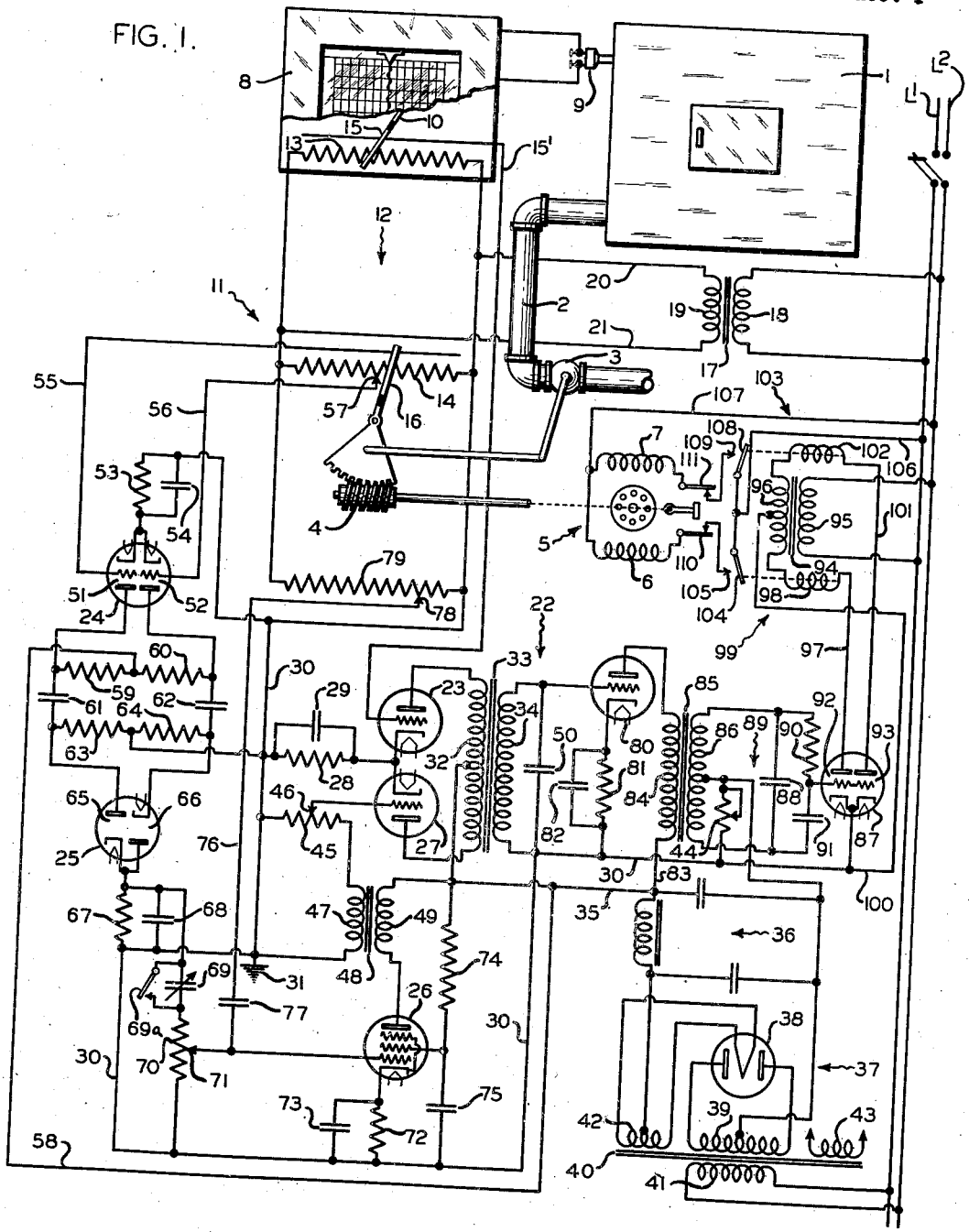
Fig. 1 is a diagrammatic representation of one embodiment of my invention.

In Fig. 1 there is illustrated, more or less diagrammatically, a temperature control system comprising a furnace 1 which is supplied with fuel through a pipe 2 in which a valve 3 is provided for controlling the fuel flow. The valve 3 is actuated through a worm gear 4 by means of a reversible electrical motor 5. The motor 5 is of the conventional induction type and is provided with two armatures which are axially displaced on the motor shaft and field windings 6 and 7 individual to each of the armatures. When the motor is operating with the field winding 6 energized, the direction of rotation is such as to increase the opening of the valve 3 and thereby to raise the temperature of the furnace 1. Conversely, the field winding 7 when energized produces opposite rotation so as to reduce the valve opening and lower the furnace temperature.

The temperature of the furnace 1 is indicated by a pyrometer 8 which may be of any suitable type for indicating the E. M. F. of a thermocouple shown at 9. The pyrometer 8 may, for example, take the form of the mechanical or "conversion" type potentiometer control instruments manufactured and sold commercially by the Brown Instrument Company, the assignee of the present invention. The Brown mechanical type potentiometer control instrument is generally disclosed in Patent 1,898,124 which was issued on February 21, 1933, to Thomas R. Harrison while the Brown "conversion" potentiometer control instrument is disclosed in the Walter P. Wills application Serial No. 421,173 which was filed on December 1, 1941.

In order to control the opening of the valve 3 as is required to maintain the furnace 1 at the desired temperature, it is necessary that the motor 5 be actuated in accordance with the indication of the pyrometer 8. In addition, in order to avoid overshooting or "hunting" of the furnace temperature about the temperature it is desired to maintain, it is desirable to control the adjustment of valve 3 and thereby the fuel admission in accordance with the extent to which the temperature of the furnace has departed from the desired temperature and also the duration of that departure. To these ends provisions are made in Fig. 1 for initially causing the opening of the valve 3 to be proportional to the displacement of the movable element 10 the pyrometer 8 from the position corresponding to the desired temperature. Such initial operation of the valve 3 following a furnace temperature change is commonly known as a follow-up adjustment. The movable element 10 of the pyrometer 8 is the member of the potentiometer control instrument which carries the slidewire contact and to which is attached the indicating pointer or pen when the instrument is of the indicating or recording type.

Thereafter the valve 3 is given additional opening or closing adjustments as required to return the furnace temperature to the desired temperature thus preventing drop in the furnace temperature. Such additional valve opening or closing adjustments are known as "resetting" or compensating adjustments and are provided to compensate for a change in furnace load or other condition which tends to vary the value of the controlling condition which the apparatus tends to maintain. In general, such resetting adjustments must be effected slowly if hunting is to be avoided in any control system in which the effect of a change in the control force on the value of the controlled quantity is delayed, as it may be delayed in furnace control by temperature lag. The latter is dependent upon the heat storage capacity of the furnace, and affects the rate of response of the furnace temperature to a change in the rate of furnace heat supply. A control system effect analogous to that due to temperature lag is produced in different ways, for example, by the inertia of movable machine elements in controlling the operation of machinery, and by the fluid storage capacity of portions of a fluid distribution system in which fluid pressures or rates of flow are controlled.

The provisions referred to for initially causing the position of the valve 3 to correspond proportionally with the position of the potentiometer slidewire contact and for thereafter effecting the desired resetting adjustments include a remote control system 11 for transmitting the mechanical movement of the movable element 10 of the potentiometer instrument to the valve 3 which ordinarily is remotely located from the potentiometer instrument.

The remote control system 11 includes a control network 12 in which a pair of slidewire resistances 13 and 14 are connected, the former of which is mounted in the pyrometer 8 and the latter in the valve operating mechanism. A slide contact 15 which is mechanically connected to the pyrometer movable element 10 but is electrically insulated therefrom contacts the slidewire resistance 13 at a position dependent upon the temperature indication of the pyrometer 8. A second slide contact 16 similarly contacts the slidewire resistance 14 at a position dependent upon the opening of the valve 3. The contact 16 is variably positioned by the valve operating mechanism but is electrically insulated therefrom.

The control network 12 is energized with alternating current from alternating current supply conductors L¹ and L² through the medium of a suitable step-down transformer 17, the primary winding 18 of which is connected to the supply conductors L¹ and L² and the secondary winding 19 of which is connected by conductors 20 and 21 to the network 12. In accordance with the arrangement of Fig. 1 the alternating potential drop between the sliding contact 15 and the right end of slidewire resistance 13 is compared to the alternating potential drop between the sliding contact 16 and the right end of resistance 14. These alternating potential drops are compared by an electronic detector and amplifier, indicated generally by the reference character 22. The electronic detector and amplifier 22 is arranged to regulate the reversible motor 5 for operation in one direction or the other and thereby the opening or closing of the valve 3 and the movement to the right or left of sliding contact 16 along resistance 14 when the potential drop between the right end of resistance 13 and contact 15 increases or decreases relatively to that between the right end of resistance 14 and contact 16.

In particular, the alternating potential drop between the right end of resistance 13 and the contact 15 is impressed on the input circuit of an electronic valve 23 and the alternating potential drop between the right end of resistance 14 and contact 16 is utilized through electronic valves 24, 25 and 26, which are interconnected as shown and which operate in a manner described in detail hereinafter, to control the potential impressed on the input circuit of an electronic valve 27. The valves 23 and 27, although shown in separate envelopes, may be contained in the same envelope, if desired. The electronic valves 24, 25 and 26 are interposed between the slidewire resistance 14 and the input circuit of electronic valve 27 for the purpose of effecting the desired follow-up and resetting adjustments of the apparatus.

The electronic valves 23 and 27 are triodes and each includes anode, control electrode, cathode and heater filament elements. The cathodes of valves 23 and 27 are connected together and through a biasing resistance 28 which is shunted by a condenser 29 to a conductor 30 which is grounded at 31 and is also connected to the right end terminals of the slidewire resistances 13 and 14.

The anode of valve 23 is connected to one end terminal of the primary winding 32 of a transformer 33 having a secondary winding 34, and the anode of valve 27 is connected to the other end terminal of winding 32. A center tap on the transformer primary winding 32 is connected by a conductor 35 to the positive output terminal of a filter 36 the input terminals of which are connected to the output terminals of a full wave rectifier 37. The rectifier 37 includes a full wave rectifier valve 38 having a pair of anodes and an associated filament type cathode. The anodes of valve 38 are connected to the opposite terminals of the high voltage secondary winding 39 of a transformer 40 having a line voltage primary winding 41 connected to alternating current supply lines L¹ and L² and also having low voltage secondary windings 42 and 43. The secondary winding 42 is connected to the filament cathode of valve 38 for supplying energizing current to the filament cathode and is provided with a center tap which is connected to the positive input terminal of filter 36. A center tap on the secondary winding 39 is connected to the negative input terminal of the filter 36 and the negative output terminal of the latter is connected through an adjustable resistance 44 to the grounded conductor 30.

Thus, the anode circuits of valves 23 and 27 are arranged to be energized with direct current voltage. The anode circuit of valve 23 may be traced from the positive terminal of the filter 36 through the conductor 35 to the center tap on the transformer primary winding 32, through the upper half of winding 32 to the anode of valve 23, the cathode thereof, the parallel connected resistance 28 and condenser 29, and conductor 30 to the negative output terminal of filter 36. The anode circuit of valve 27 may be traced from the positive output terminal of filter 36 through the conductor 35 to the center tap on the primary winding 32, through the lower half of the latter winding 32, through the lower half of the latter winding 32, to the anode of valve 27, the cathode thereof, the parallel connected resistance 28 and condenser 29, and conductor 30 to the negative terminal of filter 36.

Energizing current is supplied the heater filaments of the valves 23 and 27 from the low voltage transformer secondary winding 43.

The input circuit of valve 23 may be traced from the cathode thereof through the parallel connected resistance 28 and condenser 29 to the conductor 30, through the right end portion of slidewire resistance 13 to the contact 15, and a conductor 15¹ to the control electrode of valve 23. Thus, the alternating potential between the contact 15 and the right end of slidewire resistance 13 is impressed on the input circuit of valve 23, being superimposed on the unidirectional potential impressed thereon by the biasing resistance 28 and condenser 29. The input circuit of valve 27 may be traced from the cathode of this valve through the biasing resistance 28 and condenser 29 to the conductor 30, a slidewire resistance 45 and a sliding contact 46 which is in engagement with resistance 45 to the control electrode of valve 27. An alternating potential is impressed on the slidewire resistance 45 from the secondary winding 47 of a transformer 48 having a primary winding 49 which is connected in the anode circuit of valve 26. The magnitude of this alternating potential impressed across resistance 45, and a variable portion of which is impressed on the input circuit of valve 27 depending upon the position of contact 46 along resistance 45, is determined by the position of sliding contact 16 along resistance 14 in a manner explained in detail hereinafter. The input circuit of valve 27, therefore, also has an alternating potential impressed thereon which is superimposed on the unidirectional biasing potential derived from the resistance 28 and condenser 29.

The application of an alternating potential on the input circuits of each of the valves 23 and 27 causes a flow of pulsating current in the anode circuits of each of these valves and thereby through the opposite halves of the center tapped transformer primary winding 32. The pulsating current flow through the upper half of primary winding 32 causes the induction of an alternating voltage of one phase in the transformer secondary winding 34 and the pulsating current flow through the lower half of the winding 32 causes the induction of an alternating voltage of the opposite phase in the secondary winding 34. When the pulsating current flows through the opposite halves of the primary winding 32 are exactly equal and precisely in phase with each other, the fluxes established in the transformer 33 by each of these current flows will cancel each other whereby no alternating voltage will be produced in the secondary winding 34. Predominance of pulsating current flow in the upper or lower half of the primary winding 32, however, will result in the induction of an alternating voltage of one phase or of the opposite phase in the secondary winding 34. As shown, a condenser 50 is provided for tuning the secondary winding 34.

The manner in which the magnitude of the alternating potential impressed across resistance 45 and thereby on the input circuit of valve 27 is regulated depending on the position of sliding contact 16 along slidewire resistance 14 will now be described. The electronic valves 24, 25 and 26, as noted previously, are utilized for this purpose. Electronic valve 24 contains two triodes 51 and 52 within the same envelope. Each triode includes anode, cathode, control electrode, and heater filament elements. The heater filaments are connected to and receive energizing current from the transformer secondary winding 43.

The cathodes of triodes 51 and 52 are connected together and through a biasing resistance 53 which is shunted by a condenser 54 to the grounded conductor 30. The input circuit of triode 51 may be traced from the cathode thereof, through the parallel connected resistance 53 and condenser 54 to the conductor 30, the portion of slidewire resistance 14 to the right of sliding contact 16 and from the latter through a conductor 55 to the control electrode of valve 51. The input circuit of triode 52 may be traced from the cathode of this triode through resistance 53 and condenser 54 in parallel, to conductor 30, the right half of slidewire resistance 14, and conductor 56 which is connected at one end to a contact 57 in slideable engagement with the resistance 14 and at its other end to the control electrode of valve 52. Thus, the alternating potential between the sliding contact 16 and the right end of resistance 14 is impressed on the input circuit of triode 51, and the alternating potential on slidewire resistance 14 to the right of contact 57 is impressed on the input circuit of triode 52. In each case the impressed alternating current is superimposed on the unidirectional bias potential provided by the parallel connected resistance 53 and condenser 54. When the contacts 16 and 57 are at the same position along the slidewire resistance 14, the combined alternating and unidirectional potential impressed on the input circuit of triode 51 will be exactly the same as that impressed on the input circuit of the triode 52. Upon operation of motor 5 and consequent movement of contact 16 in one direction or the other from this position, however, the alternating component of the potential impressed on the input circuit of triode 51 will be increased or decreased relatively to that impressed on the input circuit of triode 52. Stated differently, the alternating potential impressed on the input circuit of triode 52 is fixed in magnitude while that impressed on the input circuit of triode 51 is linearly representative of the position of valve 3 from a predetermined position.

Direct current voltage is applied to the anode circuits of both triodes 51 and 52 from the full wave rectifier 37 and filter 38 through a circuit which may be traced from the positive terminal of filter 38 through a conductor 58 to the point of engagement of a pair of resistances 59 and 60. From that point the anode circuit of triode 51 is traced through the resistance 59, the anode to cathode resistance of triode 51, the parallel connected resistance 53 and condenser 54, conductor 30, and resistance 44 to the negative terminal of filter 38. The anode circuit of triode 52 is traced from the point of engagement of resistances 59 and 60 through resistance 60, the anode of triode 52, the cathode, resistance 53 and condenser 54 in parallel, and conductor 30 and resistance 44 to the negative terminal of filter 38.

Since the potentials impressed on the input circuits of triodes 51 and 52 have an alternating component, the current flow through the resistances 59 and 60 in the anode circuits will be pulsating, the magnitude of the pulsating potential drop across resistance 59 being determined by the position of contact 16 along resistance 14 and that across resistance 60 being determined by the position of contact 57 along resistance 14. The pulsating potential drop across resistance 60 is fixed, and that across resistance 59 is linearly representative of the opening of the valve 3.

Resistances 59 and 60 are coupled to the electronic valve 25 by condensers 61 and 62 and resistances 63 and 64 across the latter of which an alternating potential of one phase or the opposite phase is produced depending upon the relative magnitude of the pulsating potential drops produced across resistances 59 and 60. Valve 25, as shown, includes two inversely connected diode elements 65 and 66 within one envelope. Each diode includes an anode, a cathode, and a heater filament to which energizing current is supplied by the transformer secondary winding 43. The remote ends of resistances 59 and 60 are connected by a separate condenser 61 and 62 to the anode and the cathode, respectively, of an associated diode 65 and 66. The resistances 63 and 64 are connected in series between the anode and cathode of the diodes 65 and 66 and the point of engagement of the resistances 63 and 64 is connected to the grounded conductor 30. The cathode of diode 65 and anode of diode 66 are connected together and through a parallel connected resistance 67 and condenser 68 to the grounded conductor 30.

Thus, the alternating potential drop produced across resistance 63 is arranged to be impressed on the diode 65 and the parallel connected resistance 67 and condenser 68, and the alternating potential drop produced across resistance 64 is arranged to be impressed on the diode 66 and the parallel connected resistance 67 and condenser 68.

When the alternating potential produced across resistance 63 is greater than that produced across resistance 64 due to the coupling of these resistances to the resistances 59 and 60, as is the case when the alternating potential impressed on the input circuit of triode 51 is greater than that impressed on the input circuit of triode 52, a resultant unidirectional potential drop having the polarity to render the upper terminal positive will be produced across resistance 67 due to the rectifying action of the diodes 65 and 66. Conversely, when the alternating potential impressed on the resistance 63 is less than that produced across resistance 64, as is the case when the alternating potential impressed on the input circuit of triode 52 is predominant, a resultant unidirectional potential drop will be produced across resistance 67 having the polarity to render the upper end negative.

No potential drop will be produced across resistance 67 when the alternating potentials on the input circuits of both triodes 51 and 52 are equal, which condition exists when the positions of sliding contact 16 and contact 57 along resistance 14 coincide. Upon movement of sliding contact 16 to the left from that position, however, the alternating potential impressed on the input circuit of triode 51 will be greater than that impressed on the input circuit of triode 52, and consequently, the polarity of the potential drop produced across resistance 67 will be such as to render the upper terminal thereof positive. Movement of sliding contact 16 to the right from that position, on the other hand, will result in a predominance of alternating potential on the input circuit of triode 52 and thereby in the production of a potential drop across resistance 67 of the polarity to render the upper terminal of the latter negative.

Rectifier valve 25 in conjunction with elements 61, 62, 63, 64, 67 and 68, therefore, operates to compare and convert the pulsating output potentials of triodes 51 and 52 to produce a unidirectional potential of polarity dependent upon the departure of valve 3 from a predetermined position (determined by the position of contact 57 along slidewire resistance 14) and of a magnitude proportional to the extent of the valve departure from that position.

The unidirectional potential drop so produced across resistance 67 is applied to the input circuit of the electronic valve 26 through a network including a variable condenser 69 and a resistance 70 which is provided with an adjustable tap 71. This network operates to impress changes only in the potential drop across resistance 67 to the input circuit of valve 26 and may be traced from the upper end of resistance 67 through condenser 68, resistance 70 and conductor 30 to the lower terminal of resistance 67. The lower terminal of resistance 70 is connected through a bias resistance 72 which is shunted by a condenser 73 to the cathode of valve 26 and the tap 71 is connected to the control electrode thereof. When no potential drop exists across resistance 67, no current will flow through condenser 69 and resistance 70, and therefore, under this condition no potential is impressed on the input circuit of valve 26. Upon the appearance of a potential drop of one polarity across resistance 67, however, a charging current will flow through resistance 70 to condenser 69 until the condenser is fully charged for the particular value of potential across resistance 67. The direction of charging current flow through resistance 70 is determined by the polarity of the potential drop across resistance 67 and is downward to render the upper terminal of resistance 70 positive when the upper terminal of resistance 67 is positive, and is upward to render the lower terminal of resistance 70 positive when the lower terminal of resistance 67 is positive. Thus, the potential drop produced across resistance 70 is variable in polarity and is of one polarity or the other dependent upon the polarity of the potential across resistance 67 and also upon the relative magnitudes of the potentials across resistance 67 and condenser 69. The potential drop across resistance 70, in addition, is transitory since charging current flows through this resistance to produce the potential drop only so long as charging current flows into or out of the condenser 69 at the then value of potential drop across resistance 67. This operation is utilized in a manner to be explained to produce the desired resetting adjustments of the system.

Valve 26 is a variable-mu pentode such, for example, as the type known and sold commercially as the 6F7 and includes an anode, suppressor, screen and control electrodes, a cathode and a heater filament to the latter of which energizing current is supplied from the transformer secondary winding 43. If desired the valve 26 may be a pentagrid converter such as the type 6L7. The suppressor electrode and cathode are internally connected. Anode voltage is supplied valve 26 from the full wave rectifier 37 and filter 36 through a circuit which may be traced from the positive terminal of filter 36 through conductor 35, the primary winding 49 of transformer 48, the anode to cathode resistance of valve 26, the parallel connected resistance 72 and condenser 73, and conductor 30 and resistance 44 to the negative terminal of filter 36. Screen voltage is obtained by connecting the screen through a resistance 74 to the positive terminal of filter 36. A condenser 75 is also employed to connect the screen to the conductor 30 and through resistance 44 to the negative terminal of filter 36.

The input circuit of valve 26 includes, in addition to the network comprising elements 67, 68, 69, 70, 71, 72 and 73, a branch which may be traced from the control electrode through a conductor 76, in which a condenser 77 is inserted, to a contact 78 in engagement with a slidewire resistance 79 which is connected in the network 12 in parallel with slidewire resistances 13 and 14, conductor 30 and the parallel connected resistance 72 and condenser 73 to the valve cathode. Since an alternating potential is maintained across the resistance 79 by the transformer 17, the circuit branch just traced operates to impress an alternating potential on the input circuit of the valve 26. The magnitude of this alternating potential is determined by the position of the sliding contact 78 along the length of the resistance 79. As is explained more fully hereinafter, adjustment of contact 78 along resistance 79 operates to vary the control point of the system, or in other words, the temperature of the furnace 1 which the apparatus seeks to maintain.

The application of this alternating potential on the input circuit of valve 26 causes a pulsating current flow through the transformer primary winding 49 and thereby the induction of an alternating potential in the transformer secondary winding 47. This induced alternating potential is impressed across resistance 45 and a portion of the alternating potential across the latter is impressed on the input circuit of valve 27 as previously explained.

The magnitude of the alternating potential induced in the transformer secondary winding 47 and thereby impressed on the input circuit of triode 27 is determined primarily by the magnitude of the alternating potential impressed on the input circuit of the valve 26, but is arranged to be varied in accordance with the polarity and magnitude of the unidirectional potential impressed on the input circuit of valve 26 from the resistance 70. This result is obtained by virtue of the operation of the valve 26 which, as already noted, is a variable-mu pentode. The amplification factor of such valves is a function of the negative bias applied to the control electrode, and more particularly, decreases as the negative bias is increased. The cathode biasing resistance 72 and condenser 73 operate normally to maintain a predetermined negative bias on the control electrode of valve 26, and accordingly, when no potential drop is impressed on the input circuit of valve 26 from the resistance 70, the amplification factor of valve 26 is a predetermined value. At this amplification factor the alternating potential impressed on the input circuit of valve 26 from the portion of resistance 79 to the right of contact 78 causes a pulsating current flow of predetermined magnitude in the output circuit of valve 26 and thereby the induction of an alternating potential of predetermined magnitude in the transformer secondary winding 47.

It is noted that the sliding contact 46 is so adjusted along the length of resistance 45 that the alternating potential then impressed on the input circuit of valve 27 is exactly the same as that impressed on the input circuit of valve 23 when the sliding contact 15 is at a position along the length of resistance 13 corresponding to the temperature it is desired to maintain in the furnace 1.

When a unidirectional potential is produced across the resistance 70 as a result of a change in the potential drop across resistance 67 and thereby as a result of a change in the position of sliding contact 16 along the length of resistance 14, however, the amplification of the valve 26 is varied in one direction or the other and to an extent depending upon the direction and the extent of the change to produce a corresponding change in the alternating potential induced in the transformer secondary winding 47 and thereby applied to the input circuit of valve 27. The alternating potential applied to the input circuit of valve 27 is thus varied, in response to a change in the position of sliding contact 16 along resistance 14, to balance the variations in alternating potential applied to the input circuit of valve 23 produced by a change in position of the sliding contact 15 along slidewire resistance 13 and thereby to reduce to zero the alternating voltage induced in the transformer secondary winding 34 as a result of such change in position of contact 15 along slidewire resistance 13. Because of the charging action of condenser 69 in the input circuit of the valve 26, however, the change in negative bias potential on the input circuit of valve 26 diminishes after a time and as a result the amplification of valve 26 tends to be restored to the value determined by the cathode biasing resistance 72. The induced alternating potential in the transformer secondary winding 47 and applied to the input circuit of valve 27 thus similarly tends to be restored to the predetermined value heretofore mentioned.

The alternating potential induced in transformer primary winding 34 is impressed on the input circuit of an electronic valve 80 which is employed as an amplifier valve and includes anode, control electrode, cathode and heater filament elements. Energizing current is supplied the heater filament from the transformer secondary winding 43. The input circuit of valve 80 may be traced from the cathode through a cathode biasing resistance 81 which is shunted by a condenser 82 to the lower terminal of transformer secondary winding 34, and through the latter to the control electrode of valve 80. Anode voltage is supplied valve 80 from the full wave rectifier 37 and filter 36 through a circuit which may be traced from the positive terminal of filter 36 to a conductor 83 in which the primary winding 84 of a transformer 85 is inserted, the anode to cathode resistance of valve 80, biasing resistance 81 and condenser 82 in parallel, and resistance 44 to the negative terminal of filter 36. Transformer 85 is also provided with a center tapped secondary winding 86 which is connected to the input terminals of an electronic valve 87.

When an alternating potential of one phase or the other is induced in the transformer secondary winding 34, pulsating current of corresponding phase will flow in the output circuit of valve 80 through the transformer primary winding 84 to cause the induction of an alternating voltage of corresponding phase in the transformer secondary winding 86. A condenser 88 is connected in parallel with the winding 86 for tuning the latter. The transformer secondary winding 86 is connected in a phase shifting bridge network 89 and comprises two arms thereof. A resistance 90 is connected in a third arm and a condenser 91 is connected in the remaining arm.

Electronic valve 87 includes two triodes 92 and 93 in the same envelope. Each triode includes anode, control electrode, cathode, and heater filament elements. The heater filament elements are connected to and receive energizing current from the transformer secondary winding 43.

The input circuits of triodes 92 and 93 are connected in parallel and is connected to the output terminals of the phase shifting bridge network 89. Specifically, the control electrodes of triodes 92 and 93 are connected to each other and to the point of engagement of the resistance 90 and condenser 91. The cathodes of these triodes are connected together and are connected through the resistance 44 to the center tap on the transformer secondary winding 86.

Anode voltage is supplied the triodes 92 and 93 from the alternating current supply conductors $L^1$ and $L^2$ through the medium of a transformer 94 having a line voltage primary winding 95 connected to the supply conductors $L^1$ and $L^2$ and a high voltage center tapped secondary winding 96. The anode circuit of triode 92 may be traced from the lower terminal of secondary winding 96, as seen in the drawings, through a conductor 97 in which the operating winding 98 of a relay 99 is inserted to the anode, the cathode, and a conductor 100 to the center tap on secondary winding 96. The anode circuit of triode 93 may be traced from the upper terminal of secondary winding 96 through a conductor 101 in which the operating winding 102 of a relay 103 is inserted to the anode, the cathode, and conductor 100 to the center tap on secondary winding 96.

Relay 99 controls the operation of a switch arm 104 into and out of engagement with a fixed contact 105. When switch arm 104 engages contact 105, an energizing circuit is completed for field winding 6 of reversible motor 5. This circuit may be traced from the alternating current supply conductor $L^1$ through a conductor 106 to the switch arm 104, contact 105, motor field winding 6 and a conductor 107 to the supply conductor $L^2$.

Relay 103 controls the operation of a switch arm 108 into and out of engagement with a fixed contact 109. When switch arm 108 engages contact 109, an energizing circuit is completed for field winding 7 of motor 5. This circuit may be traced from the supply conductor $L^1$ through conductor 106 to the switch arm 108, contact 109, motor field winding 7 and conductor 107 to the supply conductor $L^2$. It will be noted that since the anode circuits of triodes 92 and 93 are energized by opposite halves of the transformer secondary winding 96 these circuits are arranged to be conductive during alternate half cycles of the alternating current supplied by conductors $L^1$ and $L^2$.

As is shown in the drawings, a limit switch 110 is connected between the motor field winding 6 and the switch 104, 105 controlled by relay 99, and a limit switch 111 is connected between the motor field winding 7 and the switch 108, 109 controlled by relay 103. Limit switches 110 and 111 are operated by a suitable member connected to the motor shaft and are provided to interrupt the operation of motor 5 when the latter has operated to the extreme limits of adjustment of fuel valve 3.

When no alternating potential is induced in the transformer secondary winding 86, the control electrodes of triodes 92 and 93 will be negatively biased by the unidirectional potential drop produced across resistance 44 by the flow of current therethrough from the output circuits of valves 23, 26, 27 and 80 sufficiently to maintain the current flow through relay windings 98 and 102 below the normal operating level of the relays, and consequently, the switch arms 104 and 108 will then be out of engagement with their associated contacts 105 and 109. To insure this result the switch arms 104 and 108 are preferably biased by spring or other means not shown out of engagement with their associated contacts.

Upon the induction of an alternating potential of one phase in the transformer secondary winding 86, the control electrodes of triodes 92 and 93 will be driven less negative or even positive depending upon the magnitude of the induced alternating potential during the half cycle that the anode of triode 92 is positive. This will result in an increase in the energizing current flow through the winding 98 of relay 99 and thereby operation of switch arm 104 into engagement with contact 105 to close the energizing circuit to motor field winding 6. Similarly, when an alternating potential of opposite phase is induced in the transformer secondary winding 86, the control electrodes of triodes 92 and 93 will be driven less negative or even positive during the half cycle that the anode of triode 93 is positive, thus effecting an increase in the energizing current flow through the relay winding 102 and thereby operation of switch arm 108 into engagement with contact 109, and consequently, closure of the energizing circuit to motor field winding 7.

The phase shifting network 89 is provided to cause the alternating potential impressed on the control electrodes of the triodes 92 and 93 to be exactly in phase with the alternating potential impressed on the anodes of these triodes by the transformer secondary winding 96 and the components 90 and 91 of the network 89 are chosen so as to attain this result. Such a phase shifting network is required when it is desired to have the relays 99 and 103 normally deenergized. The tuning condensers 50 and 88 introduce some shift in phase in the alternating potential derived from the transformer secondary winding 34 and impressed on the input circuits of the triodes 92 and 93 relatively to the alternating potentials impressed on the anode circuits of these triodes. If such an alternating potential is impressed on the input circuits of the triodes 92 and 93, an increase in anode current through each triode and to each relay winding will be effected whereby both relays will tend to operate regardless of the phase of the impressed alternating potential. This difficulty is overcome by providing the phase shifting network 89 to compensate for such phase shifts.

With the furnace operating condition such that the control network 12 has been balanced or stabilized for an appreciable period with the contacts 15 and 16 at the center of their associated slidewire resistances, the alternating potential impressed on the input circuit of triode 27 from the transformer secondary winding 47 and resistance 45 will be exactly the same as that impressed on the input circuit of triode 23 from the portion of slidewire resistance 13 to the right of sliding contact 15. Under this condition no resultant alternating potential will be produced in the transformer secondary windings 34 and 86, and therefore, the relays 99 and 103 will both be deenergized and the energizing circuits to motor field windings 6 and 7 both open whereby the motor 5 will be at rest. In addition the alternating potential impressed on the input circuit of triode 51 from the portion of the slidewire resistance 14 to the right of contact 57 will be precisely the same as that impressed on the input circuit of the triode 52 from the portion of resistance 14 to the right of contact 16 since the positions of contacts 57 and 16 along the resistance 14 then coincide. Therefore, there will then be no current flow through the resistance 67, nor through the resistance 70, and furthermore, there will then be no charge on condenser 69. Any charge which may previously have existed on condenser 69 will have leaked off, the apparatus having been stabilized for an appreciable period, as noted, with no current flow through resistance 67. The negative bias impressed on the input circuit of the variable-mu pentode 26 will then be only that produced across the cathode biasing resistance 72, and accordingly, the gain of the pentode 26 will be its normal, predetermined value whereby the alternating potential induced in the transformer secondary winding 47 will be of such a value as to impress an alternating potential on the input circuit of triode 27 which is precisely of the same magnitude as the alternating potential impressed on the input circuit of triode 23 when the contact 15 is in engagement with the resistance 13 at the center of the latter.

On a change in the furnace heat output, for example, on an increase in the output followed by a prolonged period in which no further change in the rate of heat output occurs, the furnace temperature will decrease and subsequently the sliding contact 15 will be adjusted by the pyrometer 8 to the left along the length of resistance 13. Such adjustment of the contact 15 will effect an increase in the magnitude of the alternating potential impressed on the input circuit of the triode 23 and thereby cause the induction of a resultant alternating potential of the phase in the transformer secondary winding 34 required to cause energization of the motor field winding 6 and consequently operation of the motor 5 in the direction to produce an opening adjustment of the fuel valve 3 and an adjustment of the sliding contact 16 to the left along the length of the resistance 14. Such adjustment of the contact 16 results in an increase in alternating potential on the input circuit of triode 51 and thereby in the production of a unidirectional potential drop across resistance 67 of the polarity to render the upper terminal of the latter positive. This potential on resistance 67 will cause a charging current flow in the circuit including resistance 70 and condenser 69, which current in flowing through the resistance 70 will operate to render the upper terminal of the latter positive. This action will operate, as previously explained, to decrease the negative bias on the input circuit of valve 26, thus increasing the amplification factor of the latter and causing an increase in the alternating potential induced in the transformer secondary winding 47 and applied to the input circuit of triode 27. Such increase in alternating potential on the input circuit of triode 27 effects a reduction in the alternating potential induced in the transformer secondary winding 34 and will render the latter zero when the adjustment of contact 16 along resistance 14 by motor 5 has been proportional to the adjustment of contact 15 along resistance 13. The adjustment given valve 3 will then also be proportional to the extent of adjustment of contact 15 and, moreover will be in the direction to increase the supply of fuel to the furnace 1. It is noted that the throttling range of the apparatus, that is, the adjustment of contact 16 along resistance 14 required to balance a given adjustment of contact 15 along resistance 13 and thereby the adjustment given valve 3 for such adjustment of contact 15 may be varied as desired, by moving contact 46 along the length of resistance 45.

The adjustment of contact 16 and valve 3 following an adjustment of contact 15, commonly known as a follow-up adjustment by those skilled in the art, is not permanent in its effect because it requires for its continuance a potential drop across resistance 70 of a magnitude determined by the extent of departure of the slide contact 15 from the position along resistance 13 corresponding to the temperature it is desired to maintain in furnace 1. As the condenser 69 charges to the potential across resistance 67, the current flow through resistance 70 and the potential drop thereacross decreases. This results in an increase in the negative bias on the input circuit of valve 26, and consequently, in a decrease in amplification factor of valve 26 and a corresponding decrease in the alternating potential applied to the input circuit of triode 27. A resultant alternating potential will then be produced in the transformer secondary winding 34 which is effective to cause further operation of motor 5 in the direction of initial operation and thereby an additional opening adjustment of contact 16 to the left. Such additional adjustment of contact 16 tends to restore the potential drop across the resistance 70 to the value required to maintain the follow-up operation, but such further adjustment is continually required to produce this result, and therefore, the motor 5 and contact 16 will creep along in the direction of the initial adjustment as long as the furnace temperature is displaced from the desired value to produce additional opening adjustments of fuel valve 3.

The rate at which the condenser 69 charges, and therefore operates to cause such additional valve opening adjustments is determined by several factors including the extent of departure of the contact 15 from the position corresponding to the desired furnace temperature, the capacity of condenser 69, and the magnitude of resistance 70. According to the present invention that rate is made sufficiently slow so that on an initial adjustment of contact 15, the total effect of the charging of condenser 69 during the time of displacement of contact 15 from its desired position is only such as to compensate for the initial furnace characteristic change which caused the reduction in temperature.

When the contact 15 begins to return to its desired position, the alternating potential impressed on the input circuit of triode 23 will fall below that impressed on the input circuit of triode 27 with the result that the motor 5 will be operated in the opposite direction to effect a closing adjustment of fuel valve 3 and positioning of contact 16 to the right. The movement of contact 16 to the right immediately produces a change in potential drop across resistance 67 and a corresponding change in potential drop across resistance 70 with the result that the amplification factor of valve 26 is reduced and the alternating potential applied to the input circuit of triode 27 is decreased. The decrease in this alternating potential will be proportional to the extent that contact 15 has returned to the desired position, the adjustment of contact 16 being a true follow-up adjustment. That is to say, the extent of adjustment of contact 16 to the right when the contact 15 is returned to its desired position will correspond to the extent of adjustment of contact 15.

Because of the resetting adjustments given the contact 16 following the initial departure of the furnace temperature from the control point, however, the total movement given the contact 16 to the left will have been greater than the movement of contact 15 to the left. As a result, when the contact 15 is restored to its desired position, the follow-up adjustment given contact 16 to the right will be insufficient to return the latter to the position from which it initially departed. Thus, when the furnace temperature has been restored to the desired value the contact 16 will come to rest at a position short of its initial position. With the contact 16 so displaced to the left of contact 57 along slidewire resistance 14, a potential drop will be produced across resistance 67 of the precise magnitude to exactly balance out the potential on condenser 69, and therefore, no potential drop will be then produced across resistance 70 and the amplification factor of valve 26 will be determined solely by the potential drop across the cathode biasing resistance 72.

The arrangement of Fig. 1 will then stabilize, if no further change in the furnace operating conditions has occurred meanwhile, with fuel being supplied to the furnace at a new and higher rate determined by the extent and duration of departure of the contact 15 from its desired position. It will be apparent that for the case of decreased heat output of the furnace, the apparatus will effect a reduction in the supply of heat to the furnace in a similar manner to thereby return and maintain the furnace temperature at the desired value.

It is thus seen that the adjustments effected by motor 5 are true compensating or resetting adjustments making it possible to maintain approximately the same furnace temperature notwithstanding changes in the furnace load which, for example, may result from substantial changes in the amount of material heated in the furnace. The rate at which such compensating adjustments are effected must be suitably related to the constants, and particularly, the time lag constant of the apparatus or process controlled, if hunting is to be avoided. In the arrangement of Fig. 1 the rate at which the fuel valve 3 is adjusted while the contact 15 is displaced from the control point may be controlled in a number of ways, for example by adjustment of the capacity of the variable condenser 69, by adjustment of the value of resistance 70, or by adjustment of an additional resistance which may be provided in series with condenser 69 and resistance 70 and the parallel connected resistance 67 and condenser 68. As one such means, I have illustrated the condenser 69 as being adjustable.

In some applications it may be desired to utilize only the follow-up action of the control apparatus of Fig. 1, eliminating the resetting or compensating feature. When it is desired to so operate the apparatus, this may be accomplished by shunting out of the circuit the resetting condenser 69, as for example, by shunting the condenser 69 by a switch 69a. The apparatus will then operate as a straight throttling controller.

Figure 2:
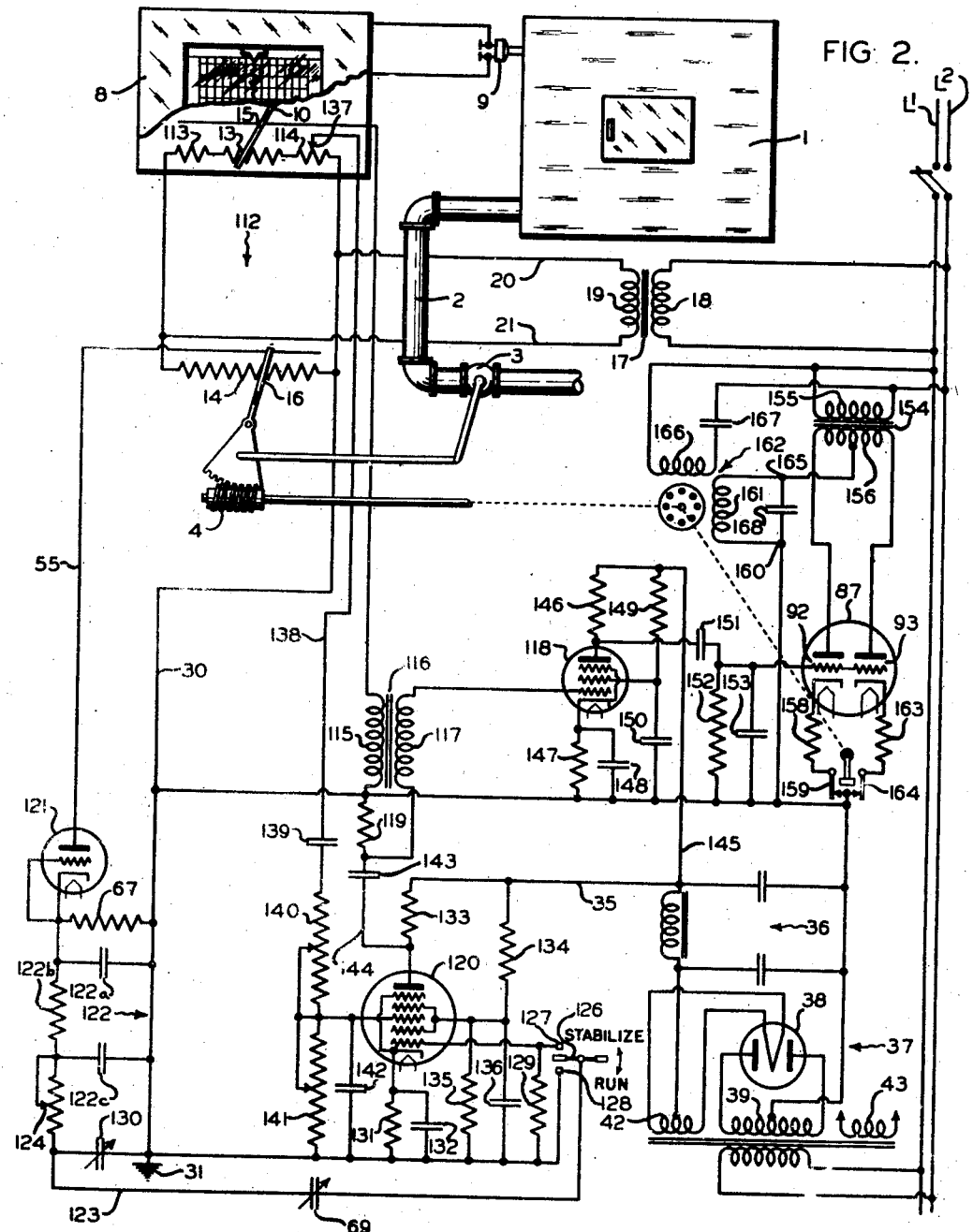
Fig. 2 is a diagrammatic representation of the preferred form of my invention.

In Fig. 2 I have illustrated, more or less diagrammatically, a modification of the arrangement of Fig. 1 for effecting the desired follow-up and resetting adjustments of the fuel valve 3 following a departure of the furnace temperature from the value it is desired to maintain. In addition, the modification of Fig. 2 includes suitable provisions for effecting an initial magnification of the corrective adjustment given fuel valve 3, on a departure of the furnace temperature from the desired value, to return that temperature to the desired value in the shortest possible time while minimizing the tendency to hunting. Parts in Fig. 2 which correspond exactly to parts of Fig. 1 have been designed by the same reference numerals.

The arrangement of Fig. 2 includes a control network 112 for transmitting the movements of the movable element 10 of the pyrometer 8 to the fuel valve 3. The control network 112 comprises two branches in one of which the slidewire resistance 13 is connected and in the other of which the slidewire resistance 14 is connected. Resistances 113 and 114 are also connected in the branch including resistance 13, being disposed in that branch on opposite sides of the resistance 13 and the resistance 114 being positioned to the right of resistance 13. The right end terminals of the two branches are connected to the grounded conductor 30. Alternating energizing current is supplied the control network 112 from the secondary winding 19 of transformer 17 the primary winding 18 of which is connected to the alternating current supply conductors L' and L².

In this modification the alternating potential produced between the slide contact 15 and the right end of resistance 114 is impressed on the primary winding 115 of a transformer 116 having a secondary winding 117. The transformer secondary winding 117 is connected to the input circuit of an electronic valve 118 in series with a resistance 119 across the latter of which an alternating potential is established by an electronic valve 120 under control of the slide contact 16. The transformer secondary winding 117 and the resistance 119 are so interconnected that the alternating potential drop across resistance 119 is opposed to that induced in secondary winding 117. The resultant of these alternating potentials is impressed on the input circuit of the electronic value 118.

The manner in which an alternating potential is established across resistance 119 under control of contact 16 and in opposition to that induced in transformer secondary winding 117 will now be described. This result is accomplished in Fig. 2 by rectifying the alternating potential produced across the portion of resistance 14 to the right of contact 16 to establish a unidirectional potential drop across the resistance 67 and utilizing this potential drop to control the bias potential on an input circuit of the valve 120. The unidirectional potential drop produced across resistance 67, in this modification, varies in magnitude in accordance with the position of contact 16 along slidewide resistance 14.

Specifically, the contact 16 is connected by a conductor 55 to the anode of a half wave rectifier valve 121 which may comprise a triode having anode, control electrode, cathode and heater filament elements, the control electrode and cathode elements being directly connected together. Energizing current is supplied the heater filament from the transformer secondary winding 43. The cathode of rectifier valve 121 is connected through the resistance 67 to the grounded conductor 30, which in turn, is connected to the right end of resistance 14. This arrangement operates to establish a unidirectional potential across resistance 67 which gradually increases from zero to a maximum value as the contact 16 is adjusted from its extreme right to its extreme left positions.

The unidirectional potential so established across resistance 67 is applied to the input terminals of a filter 122 which comprises suitable resistance and capacitive components 122a, 122b and 122c and is employed for the purpose of smoothing out the potential drop produced across resistance 67. The positive output terminal of the filter 122 is connected by a conductor 123, in which a resistance 124 and condenser 69 are inserted, to a switch arm 126. The switch arm 126 is movable between an upper contact 127 and a lower contact 128. In its upper position the switch arm 126 closes the circuit to the negative terminal of filter 122 through a resistance 129 and the grounded conductor 30. Resistance 129 is connected in an input circuit of valve 120. In its lower position the switch arm 126 closes the circuit to the negative terminal of filter 122 directly through conductor 30, resistance 129 being omitted from this closing connection. A condenser 130 is connected between the grounded conductor 30 and the end of resistance 124 remote from the filter 122.

Condenser 69 is utilized in this arrangement, as in the arrangement of Fig. 1, to produce the desired resetting or compensating adjustments of the system. The resistance 124 and condenser 130 are provided for the purpose of obtaining the heretofore referred to initially magnified fuel valve corrections on departure of the furnace temperature from the desired value, and operates to accomplish this result in a manner explained in detail hereinafter.

Electronic valve 120, to the input circuit of which the resistance 129 is permanently connected, is of the type commonly known as pentagrid converters and by way of example may be of the type known and sold commercially as the 6L7. Valve 120 includes an anode, a cathode, a heater filament and five grids which are disposed between the anode and cathode. The grid nearest the anode is directly connected to the cathode and is utilized as a supressor electrode. The grid nearest the cathode is utilized as a control electrode and is connected through the resistance 129 to the grounded conductor 30 and through a cathode biasing resistance 131 shunted by a condenser 132 to the cathode. The intermediate grid is also utilized as a control electrode. The remaining grids are connected together and are utilized as screen electrodes.

Energizing current is supplied the heater filament of valve 120 from the transformer secondary winding 43.

Anode voltage is supplied the valve 120 from the full wave rectifier 37 through a circuit which may be traced from the positive terminal of filter 36 through conductor 35, a resistance 133, the anode of valve 120, the cathode, the parallel connected resistance 131 and condenser 132, and the conductor 30 to the negative terminal of filter 36.

Screen voltage is supplied valve 120 through a circuit which may be traced from the positive conductor 35 through a resistance 134 to the screen electrodes, and through a resistance 135 which is shunted by a condenser 136 to the grounded negative conductor 30.

An alternating potential is applied to the intermediate grid of valve 120 from the resistance 114 in the control network 112 through a circuit which may be traced from a contact 137 which is in slidable engagement with resistance 114, a conductor 138 in which a condenser 139 and a pair of adjustable resistances 140 and 141 are inserted in series to the grounded conductor 30 and therethrough to the right end terminal of resistance 114. The intermeriate grid of valve 120 is connected to the point of engagement of resistances 140 and 141. Resistance 141 is provided with a condenser 142 in shunt therewith.

Thus, the valve 120 is provided with two input circuits on the first of which a unidirectional bias potential is arranged to be impressed from the resistance 67, and on the second of which an alternating potential is arranged to be impressed from the control network resistance 114, and on both of which a unidirectional bias is impressed from the cathode biasing resistance 131.

According to this modification of my invention the amplification factor and therefore, the gain of valve 120 is a predetermined value when no bias potential in addition to that established across biasing resistance 131 is impressed on the input circuit first mentioned, as for example when switch 126 is in engagement with contact 128, whereby the alternating component of potential drop produced across the anode resistance 133 is a corresponding predetermined value. This alternating potential component is impressed through a condenser 143 on the resistance 119 which is connected in the input circuit of valve 118 through a circuit which may be traced from the anode of valve 120 through a conductor 144 in which the condenser 143 and resistance 119 are connected in series to the grounded conductor 30. Thus, the condenser 143 and resistance 119 are connected in parallel to the impedance comprised of the cathode biasing resistance 131 and the anode to cathode resistance of valve 120.

The phase of the alternating potential impressed on the second mentioned input circuit of valve 120 is so related to the alternating potential induced in the transformer secondary winding 117 that the alternating potential established across resistance 119 is exactly 180° out of phase with the alternating potential induced in transformer secondary winding 117. The series connected condenser 139 and adjustable resistances 140 and 141 are provided in the second mentioned input circuit of valve 120 to permit shifting of the phase of the alternating potential applied to this input circuit of valve 120 as is required to effect such exact phase opposition of the alternating potentials produced across elements 117 and 119.

When the bias potential on the first mentioned input circuit of valve 120 is varied, as it may be when the switch 126 is in engagement with contact 127 and a charging or discharging current is flowing to or from the resetting condenser 69 through resistance 129, the amplification factor of valve 120 is changed an amount proportional to the change in bias potential. This change in amplification factor of valve 120 operates to produce a corresponding variation in the alternating component of the potential drop across resistance 133 and therefore, in the alternating potential impressed on the resistance 119. The variation in amplification factor of valve 120 is utilized, as is the amplification factor change of valve 26 in the arrangement of Fig. 1, to effect the desired follow-up and resetting adjustments of the system, and is also employed as later explained to produce the initially magnified fuel valve adjustments.

The resultant of the opposed alternating potentials established across the transformer secondary winding 117 and resistance 119 is applied to the input circuit of electronic valve 118 wherein it is amplified and the amplified quantity is impressed on the input circuits of the two triodes 92 and 93 contained within the electronic valve 87. Valve 118 is a pentode having an anode, suppressor, screen and control electrodes, a cathode and a heater filament to the latter of which energizing current is supplied by the transformer secondary winding 43. Anode voltage is supplied valve 118 from the rectifier 37 through a circuit which may be traced from the positive terminal of filter 36 through a conductor 145, a resistance 146, the anode to cathode resistance of valve 118, a cathode biasing resistance 147 which is shunted by a condenser 148, and conductor 30 to the negative terminal of filter 36. Energizing voltage is supplied the screen electrode through a circuit which may be traced from conductor 145 to a resistance 149 to the screen and from the latter to the conductor 30 through a condenser 150. The input circuit of valve 118 may be traced from the cathode, the parallel connected resistance 147 and condenser 148, conductor 30, resistance 119, and transformer secondary winding 117 to the control electrode. Thus, the potential drops established across elements 117, 119 and 147 are connected in series in the input circuit of valve 118, the potential drop across resistance 147 being unidirectional and those across elements 117 and 119 being alternating and, in addition, in phase opposition so that when they are exactly equal they will neutralize each other. When one or the other of the alternating potentials predominates, however, a resultant alternating potential of corresponding phase will be applied to the input circuit of valve 118 to thereby establish an alternating potential of corresponding phase but of increased amplitude across resistance 146.

The alternating potential so established across resistance 146 is impressed simultaneously and equally on both of the control electrodes of triodes 92 and 93 through a condenser 151 and a resistance 152. The resistance 152 effectively limits the extent to which the control electrodes of triodes 92 and 93 may be driven positive with respect to their associated cathodes. A condenser 153 is desirably connected in shunt to resistance 152 for filtering out harmonic potential components which may appear across resistance 152 and otherwise tend to swamp out the regulating potential applied to input circuits or triodes 92 and 93.

Anode voltage is applied to the output circuits of triodes 92 and 93 from the alternating current supply conductors L' and L² through a transformer 154 having a line voltage primary winding 155 which has its terminals connected to the supply conductors L' and L², and also having a center tapped secondary winding 156. The anode of triode 92 is connected to the left end terminal of the transformer secondary winding 156 and the anode of triode 93 is connected to the right end terminal of the transformer secondary winding 156. The cathode of triode 92 is connected through a cathode biasing resistance 158 and a limit switch 159 to the terminal 160 of one phase winding 161 of a two phase reversible rotating field motor 162. The cathode of triode 93 is connected through a cathode biasing resistance 163 and a limit switch 164 to the terminal 160 of motor winding 161. The other terminal 165 of motor winding 161 is connected to the center tap on the transformer secondary winding 156. Thus, the triodes 92 and 93 are utilized in this embodiment of my invention for supplying energizing current to the phase winding 161 of motor 162.

The motor 162 is preferably so constructed that the impedance of the winding 161 is of the proper value to match the impedance of the anode circuits of triodes 92 and 93 when the motor is operating in order to obtain the most efficient operation. Preferably, the motor is so constructed that it has a high ratio of inductance to resistance, for example, of the order of 6–1 or from 8–1 at the frequency of the energizing current supplied to it. This provides for maximum power during the running condition of the motor with the least amount of heating, and also provides a low impedance path for braking purposes.

Motor 162 is provided with a second phase winding 166 to which energizing current is supplied from the alternating current supply conductors L¹ and L² through a condenser 167. The condenser 167 is so selected with respect to the inductance of motor winding 166 as to provide a series resonant circuit having a unity power factor. By virtue of the series resonant circuit, the total impedance of the motor winding 166 is substantially equal to the resistance of the winding, and since this resistance is relatively low, a large current flow through the winding 166 is made possible. This permits the attainment of maximum power and torque from the motor 162 with the least amount of heating. In addition, the current flow through the motor winding 166 is in phase with the voltage of the alternating current supply conductors L¹ and L² because of the series resonant circuit. The voltage across the motor winding 166, however, leads the current by substantially 90° because of the inductance of the winding 166.

Energizing current is supplied the motor winding 161 from the transformer secondary winding 156 through the anode circuits of triodes 92 and 93 through the circuits previously traced. A condenser 168 is connected in parallel with the motor winding 161 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 92 and 93, and accordingly, provides efficient operation. The relatively low internal circuit impedance approximates the actual resistance of the winding 161, and since this resistance is relatively low, the impedance of the local circuit is also relatively low.

For the first half cycle of the alternating potential produced across the terminals of the transformer secondary winding 156, the anode of the triode 92 is rendered positive with respect to said center tap. In the second half cycle of that alternating potential, the anode of triode 93 is rendered positive. Accordingly, the triodes 92 and 93 are arranged to conduct on alternate half cycles of the alternating current supplied by the supply conductors L¹ and L².

When no alternating signal or grid bias is impressed upon the control electrode of the triodes 92 and 93 pulsating unidirectional current of twice the frequency of the alternating voltage supplied by conductors L¹ and L² is impressed on the motor winding 161. When thus energized the motor is not effectively urged to rotation in either direction, but remains at rest. Due to the relatively high direct current component of the current then flowing through the motor winding 161 the core structure of the motor 162 tends to become saturated whereby the inductive reactance of the motor winding 161 is relatively small. The condenser 168 in shunt to the winding 161 is so chosen that the condenser and motor winding then provides a parallel resonant circuit. This saturation of the core structure of the motor 162 operates to exert an appreciable damping effect on the motor rotor, or in other words, an effect tending to prevent rotation of the rotor. Consequently, if the motor rotor has been rotating, saturation of the motor core structure operates to quickly stop the rotation.

When an alternating potential is impressed on the control electrodes of triodes 92 and 93, the magnitude of the pulses of current flowing in the anode circuit of one triode 92 and 93 will be increased while the magnitude of the pulses of current flowing in the anode circuit of the other triode will be decreased. Accordingly, the pulses of unidirectional current supplied to the motor winding 161 during the first half cycle will predominate over those supplied the motor during the second half cycle. Which anode current will be increased depends upon whether the signal voltage is in phase or 180° out of phase with the voltage of the supply conductors L¹ and L².

Such energization of the motor winding 161 operates to introduce therein an alternating component of current of the same frequency as that supplied by the alternating current supply conductors L¹ and L². This alternating component of current will either lag by 90° or lead by 90° the alternating current flowing through the motor winding 166 depending upon which of the triodes 92 and 93 has its anode current increased by the prevailing alternating potential on the control electrodes, and with either phase relation the two currents produce a magnetic field in the motor core structure which rotates in one direction or the other, depending upon said current phase relation and effects rotation of the motor in the corresponding direction. Moreover, when the motor winding 161 is so energized the direct current component of current flowing therein is decreased, and consequently, the saturation of the motor core structure is decreased with the result that the rotor damping effect is reduced.

This general arrangement for operating a reversible rotating field motor is disclosed and claimed in the Wills application Serial No. 421,173 which has been referred to hereinbefore. The provision of the limit switches 159 and 164 in the cathode circuits of triodes 92 and 93 is novel with me, however, and comprises a part of the present invention. These limit switches are operated by a suitable member rigid with the shaft of motor 162 and are arranged to interrupt the energizing circuit of triode 92 or 93 to the motor phase winding 161 when the motor has operated to the extreme limits of adjustment of the fuel valve 3.

In Fig. 2 the control point, or in other words the furnace temperature it is desired to maintain, can be established at any point on the instrument slidewire resistance 13. A prerequisite for the establishment of the control point at any desired position along the resistance 13 is that the alternating potential induced in the transformer secondary winding 117 is equal and opposite to the alternating potential produced across resistance 119 when there is no current flowing in resistance 129. This condition is satisfied in the arrangement of Fig. 2 by throwing the switch arm 126 into engagement with the contact 128, the "Stabilize" position of the switch, and adjusting the contact 137 along the length of resistance 114 until the alternating potentials across the elements 117 and 119 are equal and opposite at the desired control point. The establishment of this condition will be indicated by the fact of the motor 162 remaining at rest. Both of the limit switches 159 and 164 must be closed when making this adjustment, however. The switch arm 126 may then be moved into its "Run" position, in engagement with the contact 127.

By way of illustration it is noted that when the voltage of the alternating current supply conductors L¹ and L² is 110 volts and is of a frequency of 60 cycles per second, the valve 118 may be of the type known commercially as a 6J7 type, the valve 121 may be a type 7F7, the valve 120 may be a type 6L7, the valve 87 may be a type 7N7, the transformer 116 may be a 1–1 ratio Thordarson type 57A39 transformer, and correspondingly suitable values for the various circuit constants may be as noted in the following table.

| Reference numeral | Quantity | Suggested value |
|---|---|---|
| 13 | Resistance | 55 ohms. |
| 14 | ...do... | 50 ohms. |
| 19 | Terminal voltage | 20 volts. |
| 67 | Resistance | 50,000 ohms. |
| 122a | Condenser | 25 microfarads. |
| 122b, 146 | Resistance | 110,000 ohms. |
| 122c | Condenser | 10 microfarads. |
| 124, 149 | Resistance | 500,000 ohms. |
| 130 | Condenser | 4 microfarads. |
| 69, 148 | ...do... | 10 microfarads. |
| 119, 129, 140, 141, 152 | Resistance | 1 megohm. |
| 131 | ...do... | 50,000 ohms. |
| 132 | Condenser | 25 microfarads. |
| 133 | Resistance | 300,000 ohms. |
| 134, 135 | ...do... | 150,000 ohms. |
| 136 | Condenser | 0.5 microfarads. |
| 139, 151 | ...do... | 0.05 microfarads. |
| 147, 153 | Resistance | 1,500 ohms. |
| 158, 163 | ...do... | 150 ohms. |
| 156 | Terminal voltage | 550 volts. (275 volts from center tap to each end terminal.) |
| 167, 168 | Condenser | 1 microfarad. |

In Fig. 2 the initial effect of a change in furnace temperature and consequent movement to the right or left of the instrument contact 15 from the control point is to change the alternating potential induced in transformer secondary winding 117 and as a result to impress an alternating potential of one phase or of the opposite phase, depending upon the direction of the furnace temperature change, on the input circuit of valve 118. This results in energization of the motor 162 for rotation and thereby adjustment of the fuel valve 3 and adjustment of contact 16 along slidewire resistance 14. The initial adjustment given valve 3 and contact 16 is precisely that needed to produce a change in the unidirectional potential drop across resistance 67 and consequently a change in the potential drop across resistance 129 of the proper amount to change the amplification factor of valve 120 as required to make the alternating potential drop across resistance 119 exactly equal to the new value of potential induced in the transformer secondary winding 117.

Specifically, on a decrease in the furnace temperature and a resultant adjustment of contact 15 to the left, the motor 162 will be initially operated in the proper direction and the proper amount to produce a corresponding valve opening adjustment and adjustment of contact 16 to the left. Similarly, an increase in furnace temperature and subsequent adjustment of contact 15 to the right will operate to energize motor 162 for rotation in the direction and to the extent to effect a corresponding valve closing adjustment and adjustment of contact 16 to the right.

Such system rebalancing or follow-up adjustments of the motor 162 are not continuous in their effect when the instrument contact 15 is displaced from the control point, however, but gradually diminish, and if no further adjustments were made, would disappear entirely. This phenomenon occurs as a result of the connection of the condenser 69, as shown, and is employed to effect the desired resetting adjustments of the control apparatus. In particular, as the condenser 69 gradually charges to the new value of potential drop produced across resistance 67 by the follow-up adjustment of contact 16 along resistance 14, the current flow and thereby the potential drop through resistance 129 gradually decreases. This action operates to tend to restore the amplification factor of valve 120 to the value determined solely by the cathode biasing resistance 131 and condenser 132, and therefore, the alternating potential established across resistance 119 tends to be restored to its original value. Thus, the induced alternating potential in the transformer secondary winding 117 again becomes effective to energize the motor 162 for further rotation in the same direction. The motor 162 and contact 16 will therefore creep along in the direction of initial movement as long as the contact 15 is displaced from the control point to tend to maintain a steady flow of current through resistance 129 as required to make the alternating potential drop across resistance 119 equal to that established across transformer secondary winding 117, and to give additional adjustments to the fuel valve 3. The charging or discharging action of the condenser 69 is continuous as long as the contact 15 is displaced from the control point, and hence the rebalancing adjustment of the contact 16 is continuous until the contact 15 has returned to that position.

The rate at which the condenser 69 charges and discharges is determined by the extent of departure of the contact 15 from the control point, the capacity of condenser 69, the magnitude of the resistance 129, and also the values of the other circuit constants connected in series with condenser 69, resistance 129 and resistance 67. That rate, as in the arrangement of Fig. 1 is desirably slow so that on an initial adjustment of the contact 15 the total effect of the charging or discharging of condenser 69 during the time of displacement of contact 15 from the control point is only such as to compensate for the initial furnace characteristic change which caused the change in furnace temperature.

When the relationship between the gain of the valve 120 and the unidirectional bias potential impressed thereon from the resistance 129 is linear, the follow-up action of the contact 16 along resistance 14 following a furnace temperature change is linear irrespective of the position of the instrument and valve contacts along their respective slidewire resistances, and in addition, the rate at which the resetting adjustments are produced is proportional to the deviation of contact 15 from the control point. To obtain such linearity it is noted that the rectifier valve 121 must have the characteristic that the unidirectional potential drop produced across resistance 67 is linear with respect to the alternating potential impressed on valve 121 from the slidewire resistance 14. Over the operating range of the apparatus a type 7F7 valve generally exhibits such a characteristic.

In order to maintain the effectiveness of a follow-up adjustment of the motor 162 a definite bias voltage depending on the extent of departure of the instrument contact 15 from the control point, must be maintained across resistance 129. This bias voltage can only be maintained by a constant current flow through resistance 129 which, in turn requires that the potential drop across resistance 67 increase linearly with time. The rate at which the voltage across resistance 67 increases is proportional to the bias voltage across resistance 129, and therefore, also proportional to the extent of deviation of the contact 15 from the control point.

The initial magnification of the corrective adjustment of the fuel valve 3 referred to hereinbefore is obtained by temporarily reducing the effectiveness of the follow-up or rebalancing adjustments of the contact 16 along slidewire resistance 14 whereby a magnified adjustment of the contact 16 along resistance 14 is effected. Such temporary reduction in the effectiveness of rebalancing adjustments of the contact 16 is produced by resistance 124 and condenser 130. The connection of resistance 124 and condenser 130 as shown initially operates to subdue or minimize changes in the potential tending to be impressed on the series connected condenser 69 and resistance 129 following a given change in position of contact 16 along resistance 14, and thereby in potential across resistance 67. Such subduing of the potential impressed on condenser 69 and resistance 129 is caused by the resistance 124 and condenser 130 cooperating to delay for a suitable interval the charging of the latter to the potential appearing at the output terminals of filter 122. Accordingly, contact 16 will initially be given a magnified adjustment in effecting the follow-up or rebalancing adjustment of network 112.

Stated differently, during the initial stages of the follow-up operation only a fraction of the effect of the follow-up adjustments of the contact 16 along slidewire resistance 14 will be effective to change the potential drop across resistance 129 and thereby the gain of the valve 120. The magnitude of this fraction depends upon the value of resistance 124 and condenser 130. Therefore, a larger follow-up adjustment of contact 16 is required initially to cause the alternating potential across resistance 119 to match that induced in the transformer secondary winding 117 than would otherwise be needed for this purpose if elements 124 and 130 were not provided.

Thereafter, as the condenser 130 charges to the true value of potential across the output terminals of filter 122, the charging or discharging current flow of condenser 69 through resistance 129 will change the unidirectional bias on the input circuit of valve 120 by a greater amount than is actually needed to cause a gain change in the latter sufficient to make the potential drop across resistance 119 balance out the potential across transformer secondary winding 117 because of the movement of contact 16 beyond the true follow-up position of the letter. As a result the change in potential drop created across resistance 119 will overbalance the change in potential across secondary winding 117 caused by the departure of contact 15 from the control point, and consequently, the motor 162 will be energized for rotation in the reverse direction and operate to return the contact 16 to its true follow-up position, thus reducing the magnification of adjustment of contact 16 and thereby of valve 3 to unity.

Similarly, on a return adjustment of the instrument contact 15 to the control point, the contact 16 will immediately be given a magnified return adjustment toward its initial position and thereafter the magnification in the adjustment will gradually be removed.

In the foregoing explanation of the operation of the arrangement of Fig. 2, the condition considered has been that wherein the contact 15 is given an adjustment away from the control point and then remains stationary until returned to the control point. It will be apparent, however, that in practice the adjustments of the contact 15 along slidewire resistance 13 are ordinarily gradual. If the contact 15 is adjusted slowly and continuously in the same direction, the tendency for the magnification in the adjustment of contact 16 and valve 3 to build up to its maximum value will be decreased by the potential change which is permitted to take place on condenser 130, and accordingly, the magnification will assume an intermediate value determined by the rate of adjustment of contact 15. The magnification of the adjustment of contact 16 will thus vary in proportion to the rate of adjustment of contact 15 and will be larger when the rate of adjustment of contact 15 is larger since the potential on condenser 130 will not have time to build up to the same relative extent on rapid adjustments of the contact 15 that it will on slow adjustments of that contact.

The effective magnification in the adjustment of the contact 16 obtained is thus seen to be one which may be expressed mathematically in terms of rate of change since the magnitude of the magnification obtained is proportional to the rate of the change in the condition being controlled.

The effect of such operation is to permit the initial corrective control effect in the supply of heat to the furnace 1 to be much larger than would be possible otherwise without resulting in overshooting and consequent hunting. This advantageous result is obtained because the greater part of the corrective effect is applied during the time of increasing departure of the furnace temperature from the desired value, and is removed at a suitable time before the furnace temperature has returned to the desired value to avoid overshooting and consequent hunting.

The duration and effective value of the magnification in the control effect produced by the resistance 124 and condenser 130 and their associated elements may be varied by adjustment of either or both of the elements 124 and 130. To this end the elements 124 and 130 have both been shown as being variable. The effect of adjustment of resistance 124 or condenser 130 is to vary the time required to charge the condenser 130 to the potential at the output terminals of filter 122 following a change in the latter potential.

It is noted that the initial magnified adjustments of the contact 16 and valve 3 may be limited to a desired value, on a given adjustment of contact 15 from the control point, by making the speed of adjustment of contact 16 suitably slow, as by means of the gearing 4 between the motor 162 and the valve 3, the time of adjustment of contact 16 operating to produce this result.

Figure 3:
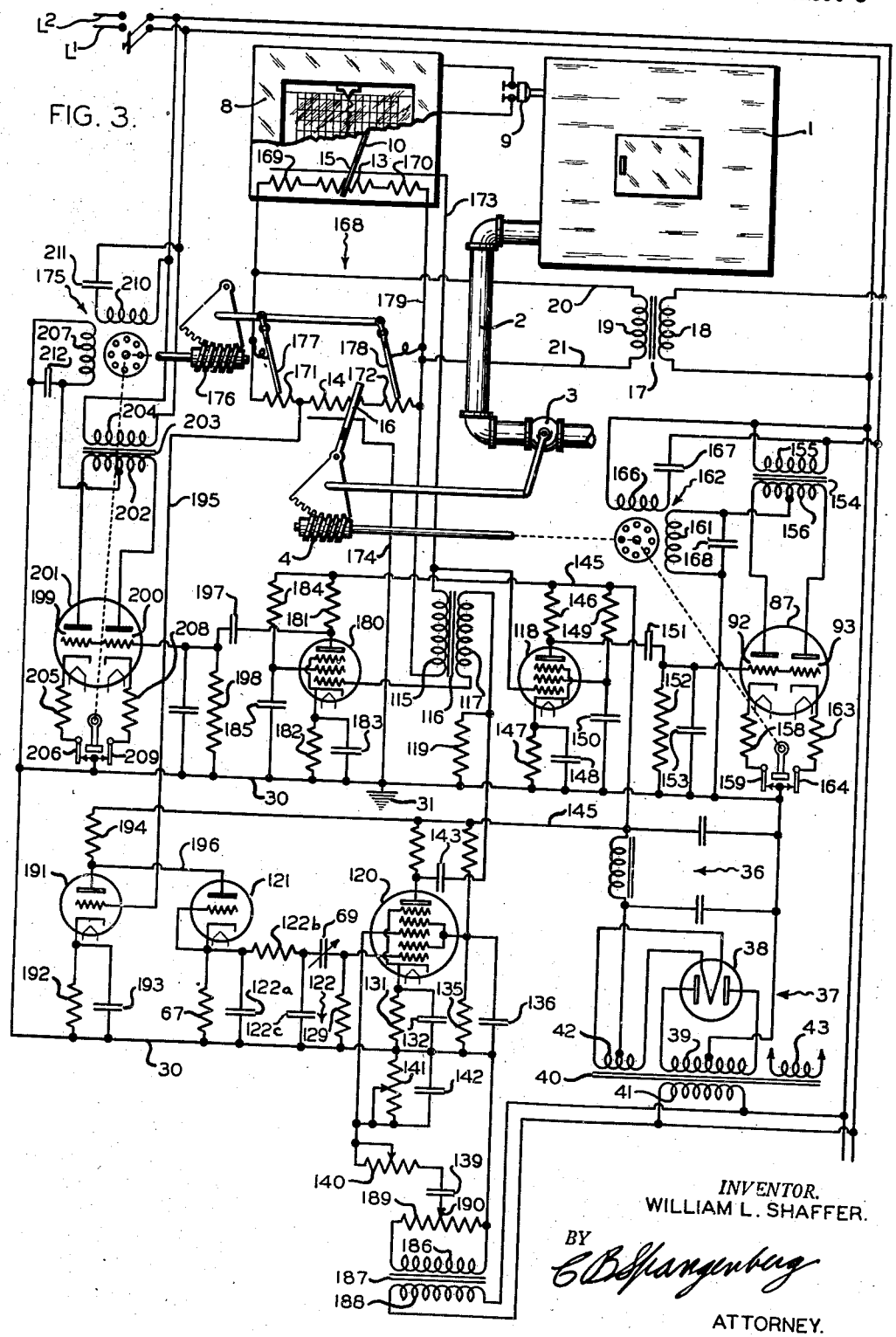
Fig. 3 illustrates a modification of the arrangement of Fig. 2.

In Fig. 3 I have illustrated, more or less diagramatically, a modification of the control arrangement of Fig. 2 in which the follow-up and resetting functions have been separated so as to be independently variable. Separate reversible motors and electronic amplifiers have been provided for accomplishing each function. This modified arrangement, in addition, makes possible a substantial reduction in the rate at which the resetting adjustments of the fuel valve 3 are effected over the slowest rate obtainable with the arrangement of Fig. 2.

With the control arrangement of Fig. 2 the rate at which the resetting operation is produced and the follow-up or throttling range may be represented by the relationship given below. By throttling range is meant the extent of adjustment of contact 15 required to effect a complete adjustment of valve 3 from its fully opened to its fully closed position.

$$\text{Reset rate} = \frac{a\,D\,Ei}{C\,R\,Ev}$$

$$\text{Throttling range} = \frac{b\,Ev}{Ei}$$

Where
$D$ = Deviation of contact 15 from control point
$Ei$ = Voltage between contact 15 and right end of resistance 114.
$C$ = Capacitance in microfarads of condenser 130.
$R$ = Resistance in ohms of resistance 124.
$Ev$ = Voltage between contact 16 and right end of resistance 14.
$a$ and $b$ = constants.

From these relationships it will be evident that after $C$ and $R$ have been increased to their practical limits in decreasing the reset rate that further reduction in the reset rate must be accomplished by either decreasing $Ei$ or increasing $Ev$. Reduction in the reset rate by varying $Ei$ or $Ev$ is not desirable, however, because such reduction is obtained at the expense of increasing the throttling range. This problem is overcome in the arrangement of Fig. 3 by means of reducing the value of the constant $a$. Further reduction in the reset rate may be obtained in this manner without affecting the throttling range. To vary the value of the constant $a$, however, it is necessary to separate the follow-up and resetting functions of the control arrangement as will become apparent from the following detailed explanation of the arrangement of Fig. 3.

In this embodiment of my invention the movements of the movable element 10 of the pyrometer 8 are transmitted to the fuel valve 3 by means including a control network 168 which, as shown, is a self balancing type Wheatstone bridge network. Alternating energizing current is supplied the bridge network 168 from the alternating current supply conductors $L^1$ and $L^2$. To this end two opposite bridge conjugate points are connected by conductors 20 and 21 to the terminals of the transformer secondary winding 19. One of these bridge energizing conjugate points is the point of engagement of resistances 169 and 171, the latter of which is variable, and the other of these bridge energizing conjugate points is the point of engagement of resistances 170 and 172. Resistances 169 and 170 are fixed in magnitude while the resistances 171 and 172 are variable. Variable resistances 171 and 172 are provided for the purpose of effecting the desired resetting adjustments of the system.

The other two opposite bridge conjugate points are connected by conductors 173 and 174 to the input terminals of the electronic valve 118. One of the last mentioned bridge conjugate points is the point of engagement of slide contact 15 with the slidewire resistance 13 which is connected in the network 168 between the resistances 169 and 170. The slide contact 15, in this modification, as in the arrangements of Figs. 1 and 2, is adjusted along slidewire resistance 13 in accordance with the changes in furnace temperature to which the pyrometer 8 is responsive. The other of the last mentioned bridge conjugate points is the point of engagement of contact 16 with the slidewire resistance 14. It will be noted that this point of engagement is grounded, being connected by conductor 174 to the grounded conductor 30. Resistance 14 is connected in the network 168 between the variable resistances 171 and 172. Contact 16 is adjusted along the length of the resistance 14 by the reversible rotating field motor 162 which is operatively connected to the contact 16 and also to the valve 3, as in the Fig. 2 arrangement, through the gear mechanism 4.

When the furnace temperature is at the value it is desired to maintain, the potential of the contact 15 is exactly the same as the potential of the contact 16. Contact 15, as illustrated, is connected by the conductor 173 to the control electrode of valve 118 and contact 16 is connected by the conductor 174 and the grounded conductor 30 to the cathode of valve 118. With the furnace temperature at the control point, therefore, no alternating potential will be impressed between the control electrode and cathode of valve 118.

Upon deviation in the furnace temperature and resultant movement of the contact 15 from the control point, however, an alternating potential of one phase or of opposite phase, depending upon the direction of the furnace temperature change, will be established between the contacts 15 and 16. This alternating potential is amplified by the valve 118 and the amplified quantity is utilized, as explained in connection with the arrangement of Fig. 2, to control the relative conductivities of triodes 92 and 93 and thereby the energization of the motor 162 for operation in one direction or the other. Motor 162, in its operation, actuates contact 16 in the direction along the length of resistance 14 to reduce to zero the alternating potential between the contacts 15 and 16 and when this has been accomplished assumes a condition of rest. In this manner the contact 16, and thereby the fuel valve 3, is given a follow-up adjustment in the direction and an amount corresponding to the direction and extent of adjustment of the contact 15. If no further adjustment of the bridge network resistance were made, the motor 162 would then remain at rest.

According to this embodiment of my invention, however, the motor 162 is caused to produce additional adjustments of the contact 16, and therefore of the fuel valve 3, in the same direction so long as the contact 15 is displaced from the control point. To this end the alternating potential established between the contact 15 and the right end of resistance 170 is utilized to regulate the rotation and direction of rotation of a reversible rotating field reset motor 175. The shaft of motor 175 is connected through suitable gear means 176 to slide contacts 177 and 178 which are in engagement with resistances 171 and 172, respectively, and so arranged that operation of motor 175 causes the contacts 177 and 178 to slide along the length of their associated resistances. Contacts 177 and 178, moreover, are so connected to resistances 171 and 172 that operation of motor 175 in one direction causes contact 177 to shunt out increasing amounts of resistance 171 and simultaneously causes contact 178 to shunt out decreasing amounts of resistance 172 and vice versa. Such adjustments of resistances 171 and 172 operate to unbalance the bridge network 168, and therefore, to produce an alternating potential between the bridge contacts 15 and 16. The direction of operation of motor 175 is so related to the direction of deflection of contact 15 from the control point that this additional unbalancing of the bridge network by variation of resistances 171 and 172 is in the same direction as that initially caused by the movement of contact 15. As a result of such additional unbalancing of the bridge network 168, the motor 162 operates to produce further network rebalancing adjustments of the contact 16 in the same direction and corresponding additional adjustments of the fuel valve 3.

The manner in which the operation of the reset motor 175 is controlled in response to deflections of the contact 15 from the control point is essentially the same as the manner in which the motor 162 of the Fig. 2 arrangement is controlled to produce the resetting function of that system. Certain fundamental and important differences exist between the two arrangements, however, which permit of the attainment of improved operation by means of the arrangement of Fig. 3 under certain conditions. These differences will become apparent as the description of the Fig. 3 embodiment proceeds.

In the Fig. 3 arrangement, similarly to that of Fig. 2, the alternating potential between the contact 15 and the right end terminal of resistance 170 is impressed through conductors 173 and 179 on the primary winding 115 of transformer 116 and the alternating potential induced in the transformer secondary winding 117 is impressed on the input circuit of an electronic valve 180. Valve 180 may be of the same type as valve 118 and is supplied with anode energizing voltage from the full wave rectifier 37 and filter 36 through a circuit which may be traced from the positive terminal of filter 36 through conductor 145, a resistance 181, the anode to cathode resistance of valve 180, a cathode biasing resistance 182 which is shunted by a condenser 183, and the grounded conductor 30 to the negative terminal of filter 36. Screen voltage is supplied valve 180 from the positive conductor 145 through a resistance 184 and a condenser 185, the screen electrode being connected to the point of engagement of the latter elements. Energizing current is supplied the heater filament of valve 180 from the transformer secondary winding 43. The input circuit of valve 180 includes in addition to the transformer secondary winding 117 the cathode biasing resistance 182 and shunt condenser 183 and the resistance 119 across which an alternating potential 180° out of phase with that induced in transformer secondary winding 117 is established by the electronic valve 120 which, in turn, is controlled in accordance with the movement of contact 16 along slidewire resistance 14.

Valve 120 may be of the same type and is energized in the same manner as the correspondingly identified valve of Fig. 2 and has an alternating potential of predetermined magnitude impressed on the input circuit including the control grid furthest from the cathode from the secondary winding 186 of a transformer 187 having a line voltage primary winding 188 the terminals of which are connected to the alternating current supply conductors $L^1$ and $L^2$. A voltage divider resistance 189 provided with an adjustable contact 190 is connected across the terminals of transformer secondary winding 186 for the purpose of facilitating the adjustment of the alternating potential impressed on the input circuit of valve 120 mentioned to a desired value.

The second input circuit of valve 120 is controlled in accordance with the magnitude of the unidirectional potential created across the resistance 129, and impressed on the control electrode nearest the cathode, as the contact 16 is adjusted along the length of resistance 14. This unidirectional potential across resistance 129 is derived through the filter 122 and the condenser 69 from the potential drop produced across resistance 67 by the flow of current through the latter from rectifier 121.

In order to decrease the rate at which the resetting function of the apparatus is obtained, however, the alternating potential established between the contact 16 and the left and of resistance 14 is not directly impressed on the output circuit of rectifier valve 121 as in the Fig. 2 arrangement, but is first amplified by means of an electronic valve 191. Valve 191 is a triode having anode, control electrode, cathode and heater filament elements and receives anode energizing voltage from the full wave rectifier 37 and filter 36 through the positive conductor 145 and the negative grounded conductor 30. As shown, a cathode biasing resistance 192 which is shunted by a condenser 193 is connected between the cathode of valve 191 and the grounded conductor 30 and an anode resistance 194 is connected between the anode and the positive conductor 145. Energizing voltage is supplied the heater filament of valve 191 from the transformer secondary winding 43.

The input circuit of valve 191 may be traced from the control electrode through a conductor 195 to the left end of resistance 14, the portion of resistance 14 to the left of contact 16, contact 16, conductor 174, the grounded conductor 30, and the parallel connected resistance 192 and condenser 193 to the cathode.

The output circuit of valve 191 is directly coupled to the rectifier valve 121 by a conductor 196 and the conductor 30. Specifically, the anode of valve 191 is connected by conductor 196 to the anode of valve 121 and the cathode of the latter is connected through the resistance 67 to the grounded conductor 30 to the latter of which the cathode of valve 191 is connected by the parallel connected elements 192 and 193. Thus, the amplified fluctuations in potential of the anode of valve 191 caused by the alternating potential between the left end of resistance 14 and contact 16 are impressed on the rectifier valve 121 to produce a unidirectional potential drop across resistance 67 having a magnitude corresponding to the position of contact 16 along resistance 14.

This potential drop across resistance 67 is impressed on the circuit including the filter 122, the condenser 69 and the resistance 129 to control the gain of the electronic valve 120 and thereby the magnitude of the alternating potential drop impressed on the resistance 119. The condenser 69 operates in this arrangement as in those previously described to gradually diminish the current flow through resistance 129 and thus the unidirectional potential drop created across the latter as a result of a given adjustment of contact 16 along resistance 14, thus requiring continuous uniform movement of contact 16 along resistance 14 to maintain a steady unidirectional current flow and consequent steady unidirectional potential drop across resistance 129. The magnitude of the unidirectional potential drop across resistance 129 required to cause the alternating potential across resistance 119 to exactly balance the alternating potential induced in transformer secondary winding 117 is determined by the magnitude of the latter alternating potential, and therefore, upon the extent of departure of the contact 15 from the control point. Consequently, the rate of adjustment of contact 16 along resistance 14 needed to make the alternating potential drop across resistance 119 balance that induced in transformer secondary winding 117 is determined by the departure from the control point of the contact 15.

The output circuit of valve 180 is coupled by a condenser 197 and a resistance 198 to the input circuits of a pair of triodes 199 and 200 which are contained within a single bottle 201 and may be identical to the triodes 92 and 93. The output circuits of triodes 199 and 200 are energized from the center tapped secondary winding 202 of a transformer 203 having a line voltage primary winding 204 connected to the alternating current supply conductors L¹ and L². In particular, the anode circuit of triode 199 may be traced from the left end of winding 202 to the anode, the cathode, a biasing resistance 205, a limit switch 206, and one phase winding 207 of motor 175 to the center tap on winding 202. Similarly, the anode circuit of triode 200 may be traced from the right end of winding 202 to the anode, the cathode, a biasing resistance 208, a limit switch 209, and the motor phase winding 207 to the center tap on winding 202.

Motor 175 is also provided with a second phase winding 210 which is connected to the alternating current supply conductors L¹ and L² through a suitable condenser 211. As illustrated, a condenser 212 is provided in shunt to the motor winding 207.

The design and construction of the motor 175 as well as its operation under control of triodes 199 and 200 may be exactly the same as that of motor 162 which has previously been described in detail in connection with Fig. 2, and therefore, further description of the operation of motor 175 is not believed necessary. Suffice it to say that when the alternating potential across resistance 119 exactly balances out the alternating potential induced in transformer secondary winding 117, the motor 175 remains at rest, but when either of said alternating potentials predominates, the motor 175 will be actuated for rotation in a corresponding direction to effect such adjustment of variable resistances 171 and 172 in the bridge network 168 as required to cause additional resetting or compensating adjustment of contact 16 in the direction of its initial movement to maintain the bridge network 168 in a balanced state.

As those skilled in the art will recognize the provision of the amplifier valve 191 makes it possible to decrease the rate at which such resetting or compensating adjustments are effected by a factor proportionate to the gain of the amplifier valve 191 below the slowest rate obtainable without the valve 191. Such reduction in the reset rate, moreover, is accomplished without affecting the throttling or follow-up range of the system, being accomplished instead by reducing the value of the constant $a$ in the relationship hereinbefore noted as representing reset rate. Mathematically, the amplifier stage including valve 191 functions to reduce the value of the constant $a$.

While I have illustrated several embodiments of electrical apparatus according to my invention for automatically controlling the temperature of a furnace, it will be apparent to those skilled in the art that my invention is not limited to such use and may, for example, be employed with equal facility for regulating pressure, flow, liquid level, and other variable characteristics. Such adaptation of my invention may be readily effected merely by operating the contact 15 of any of the forms of my invention which have been illustrated in the drawings in accordance with the pressure, flow, liquid level, etc., variations.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is as follows:

1. A system for the automatic control of a variable characteristic having adjusting means for controlling the value thereof comprising a normally stabilized alternating current energized control network, means to render said network unstable proportionally to deviations of the characteristic from a desired value, and electrical means including electrical reactance means associated with and actuated in response to instability of said network to initially operate said adjusting means an amount corresponding to the extent of deviation of the characteristic from the desired value, said electrical reactance means operating thereafter to modify the response of said electrical means to the state of stability of said control network to cause additional operation of said adjusting means in the direction of its initial adjustment.

2. A system for the automatic control of a variable characteristic having adjusting means for controlling the value thereof comprising a normally stabilized alternating current energized control network, means to render said network unstable proportionally to deviations of the characteristic from a desired value, and electrical means including electrical capacitance means associated with and actuated in response to instability of said network to initially operate said adjusting means an amount corresponding to the extent of deviation of the characteristic from the desired value, said electrical capacitance means operating thereafter to modify the response of said electrical means to the state of stability of said control network to cause additional operation of said adjusting means in the direction of its initial adjustment.

3. A system for the automatic control of a variable characteristic having adjusting means for controlling the value thereof comprising a normally stabilized alternating current energized control network, means to render said network unstable proportionally to deviations of the characteristic from a desired value, and electrical means including electrical reactance means and a variable gain electronic valve controlled thereby associated with and actuated in response to instability of said network to initially operate said adjusting means an amount corresponding to the extent of deviation of the characteristic from the desired value, said electrical reactance means operating thereafter to vary the gain of said variable gain electronic valve to modify the response of said electrical means to the state of stability of said control network to cause additional operation of said adjusting means in the direction of its initial adjustment.

4. A system for the automatic control of a variable characteristic having adjusting means for controlling the value thereof comprising a normally stabilized alternating current energized control network, means to render said network unstable proportionally to deviations of the characteristic from a desired value, a reversible electrical motor to adjust said adjusting means, and electrical means including electrical reactance means associated with and actuated in response to instability of said network to initially energize said reversible motor for operation as required to operate said adjusting means an amount corresponding to the extent of deviation of the characteristic from the desired value, said electrical reactance means operating thereafter to modify the response of said electrical means to the state of stability of said control network to cause additional energization of said motor for further operation of said adjusting means in the direction of its initial adjustment.

5. A system for the automatic control of a variable characteristic having adjusting means for controlling the value thereof comprising a normally stabilized alternating current energized control network, means to render said network unstable proportionally to deviations of the characteristic from a desired value, and electrical means including electrical reactance means associated with and actuated in response to instability of said network to initially adjust said network to its stabilized state and to simultaneously operate said adjusting means an amount corresponding to the extent of deviation of the characteristic from the desired value, said electrical reactance means operating as long as said characteristic is deviated from the desired value to modify the response of said electrical means to such restabilizing adjustment of said network to thereby effect additional restabilizing adjustments of said network and additional operation of said adjusting means in the direction of its initial adjustment.

6. A system for the automatic control of a variable characteristic having adjusting means for controlling the value thereof comprising a normally stabilized alternating current energized control network, means to render said network unstable proportionally to deviations of the characteristic from a desired value, a reversible electrical motor to adjust said adjusting means, and electrical means including electrical reactance means and a variable gain electronic valve controlled thereby associated with and actuated in response to instability of said network to initially energize said motor of operation to adjust said network to its stabilized state and to simultaneously operate said adjusting means an amount corresponding to the extent of deviation of the characteristic from the desired value, said electrical reactance means operating thereafter to vary the gain of said associated variable gain electronic valve as long as said characteristic is deviated from the desired value to modify the response of said electrical means to such restabilizing adjustment of said network to thereby additionally energize said motor to effect additional restabilizing adjustments of said network and additional operation of said adjusting means in the direction of its initial adjustment.

7. A system for the automatic control of a variable characteristic having adjusting means for controlling the value thereof comprising a normally stabilized alternating current energized control network, means to render said network unstable proportionally to deviations of the characteristic from a desired value, and electrical means including electrical reactance means associated with and actuated in response to instability of said network to initially operate said adjusting means an amount corresponding to the extent of deviation of the characteristic from the desired value and to restore said network to its stabilized state, said electrical reactance means operating thereafter to diminish the effectiveness of such restabilization of said network on said electrical means to thereby effect additional operation of said adjusting means in the direction of its initial adjustment.

8. A system for the automatic control of a variable characteristic having adjusting means for controlling the value thereof comprising a normally stabilized alternating current energized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, control means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said control means, said electronic amplifier having output terminals to which said control means are connected, means to control the operation of said electronic amplifier by said first mentioned alternating potential, means to derive an additional alternating potential to control the operation of said electronic amplifier including a variable gain electronic valve included in said electronic amplifier and having output terminals from which said additional alternating potential is derived and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, a reactance, and a connection including said unidirectional potential, said reactance and the input terminals of said variable gain valve in series.

9. A system for the automatic control of a variable characteristic having adjusting means for controlling the valve thereof comprising a normally stabilized alternating current energized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, reversible motor means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said reversible motor means, said electronic amplifier including electronic valve means having input terminals and output terminals, means to impress said first mentioned alternating potential on said input terminals, means to impress an alternating potential on said input terminals in opposition to said first mentioned alternating potential including a variable gain electronic valve having output terminals which are coupled to the input terminals of said first mentioned electronic valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, a reactance, and a connection including said unidirectional potential, said reactance and the input terminals of said variable gain valve in series, and means coupled to the output terminals of said electronic valve means to energize said reversible motor means for rotation in one direction or the other when the opposed alternating potentials impressed on the input terminals of said electronic valve means are unequal.

10. A system for the automatic control of a variable characteristic having adjusting means for controlling the value thereof comprising a normally stabilized alternating current energized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, reversible motor means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said reversible motor means, said electronic amplifier including a pair of electronic valves each of which have input terminals and output terminals, means to impress said first mentioned alternating potential on the input terminals of one of said valves, means to impress an alternating potential on the input terminals of the other of said valves including a variable gain electronic valve having output terminals which are coupled to the input terminals of said last mentioned valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, a capacitance, and a connection including said unidirectional potential, said capacitance and the input terminals of said variable gain valve in series, and means coupled to the output terminals of both of said first mentioned electronic valves to energize said reversible motor means for rotation in one direction or the other when alternating potentials impressed on the input terminals of said first mentioned valves are unequal.

11. A system for the automatic control of a variable characteristic having adjusting means for controlling the value thereof comprising a normally stabilized alternating current energized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, reversible motor means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said reversible motor means, said electronic amplifier means including an electronic valve having input terminals and output terminals, means to impress said first mentioned alternating potential on said input terminals, means to impress an alternating potential on said input terminals in opposition to said first mentioned alternating potential including a variable gain electronic valve having an output circuit which is coupled to the input terminals of said first mentioned electronic valve and also having a pair of input circuits, a resistance shunting one of said input circuits, means to impress an alternating potential of predetermined magnitude on the other input circuit, means to impress a unidirectional potential on the first mentioned input circuit of said variable gain valve to vary the gain of the latter comprising means to rectify said second mentioned alternating potential to produce a unidirectional potential of magnitude varying in accordance with the magnitude of said second mentioned alternating potential, a capacitance, and a connection including said unidirectional potential, said capacitance and said resistance in series. and means coupled to the output terminals of said first mentioned electronic valve to energize said reversible motor means for rotation in one direction or the other when the opposed alternating potentials impressed on the input terminals of said first mentioned valve are unequal.

12. A system for the automatic control of a variable characteristic having adjusting means for controlling the value thereof comprising a normally stabilized alternating current energized control network having a control slidewire resistance and slide contact, follow-up slidewire resistance and slide contact, and a compensating slidewire resistance and contact, means to adjust said control slide contact along said control slidewire resistance proportionally to deviations of the characteristic from the desired value, means to derive an alternating potential from said network of one phase or of opposite phase depending upon the direction of departure of said control contact from a predetermined position along said control slidewire resistance, means to derive a second alternating potential from said network of magnitude determined by the position of said control contact along said control slidewire resistance, reversible motor means to operate said adjusting means and to adjust said follow-up slide contact along said follow-up slidewire resistance, means to derive a third alternating potential from said network of magnitude determined by the position of said follow-up contact along said follow-up slidewire resistance, reversible motor means to adjust said compensating contact along said compensating resistance, electronic amplifier means to regulate the operation of said first mentioned reversible motor means, said electronic amplifier having an input circuit and also an output circuit connected to said first mentioned reversible motor means, means to impress said first mentioned alternating potential on said input circuit, a second electronic amplifier means to regulate the operation of said second mentioned reversible motor means and having an input circuit and an output circuit connected to said second mentioned reversible motor means, means to impress said second mentioned alternating potential on the input circuit of said second mentioned electronic amplifier means, means to impress an additional alternating potential on the input circuit of said second electronic amplifier means in opposition to said second mentioned alternating potential including a variable gain electronic valve having output terminals which are coupled to the input circuit of said second electronic amplifier means and also having an input circuit, means to impress an alternating potential of predetermined magnitude on the input terminals of said variable gain valve, means to impress a unidirectional potential on the input terminals of said variable gain valve to vary the gain of the latter comprising means to rectify said third mentioned alternating potential to produce a unidirectional potential of magnitude varying in accordance with the magnitude of said third mentioned alternating potential, a capacitance, and a connection including said unidirectional potential, said capacitance and the input terminals of said variable gain valve in series.

13. A system for the automatic control of a variable characteristic having adjusting means for controlling the value thereof comprising a normally stabilized alternating current energized control network, means to render said network unstable proportionally to deviations of the characteristic from a desired value, and electrical means including electrical reactance means associated with and actuated in response to instability of said network to operate said adjusting means an amount corresponding to the extent of deviation of the characteristic from the desired value, said electrical reactance means operating on initial operation of said adjusting means to control the response of said electrical means to the state of stability of said control network in such a manner as to temporarily magnify the operation of said adjusting means.

14. A system for the automatic control of a variable characteristic having adjusting means for controlling the valve thereof comprising a normally stabilized control network, means to render said network unstable proportionally to deviations of the characteristic from a desired value, and electrical means associated with and actuated in response to instability of said network to adjust said network to reduce the instability and to operate said adjusting means an amount corresponding to the extent of deviation of the characteristic from the desired value, said electrical means including electrical capacitance means and an associated variable gain electronic valve, said electrical capacitance means and associated variable gain electronic valve being responsive to the restabilizing adjustment of said network and operative on initial operation of said adjusting means to temporarily magnify the operation of said adjusting means.

15. A system for the automatic control of a variable characteristic having adjusting means for controlling the value thereof comprising a normally stabilized alternating current energized control network, means to render said network unstable proportionally to deviations of the characteristic from a desired value, and electrical means associated with and actuated in response to instability of said network to operate said adjusting means an amount corresponding to the extent of deviation of the characteristic from the desired value, said electrical means including electrical reactance means operative on initial operation of said adjusting means to control the response of said electrical means to the state of stability of said control network in such a manner as to temporarily magnify the operation of said adjusting means, and including other electrical reactance means operative thereafter to modify the response of said electrical means to the state of stability of said control network to cause additional operation of said adjusting means at a uniform rate determined by the extent of such deviation.

16. A system for the automatic control of a variable characteristic having adjusting means for controlling the value thereof comprising a normally stabilized alternating current energized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, reversible motor means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said reversible motor means, said electronic amplifier means including an electronic valve having input terminals and output terminals, means to impress said first mentioned alternating potential on said input terminals, means to impress an alternating potential on said input terminals in opposition to said first mentioned alternating potential including a variable gain electronic valve having output terminals which are coupled to the input terminals of said first mentioned electronic valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, an electrical reactance, a connection including said reactance and the input terminals of said variable gain valve in series, means to impress said unidirectional potential on said connection including electrical reactance means to delay the application of changes in said unidirectional potential to said connection, and means coupled to the output terminals of said first mentioned electronic valve to energize said reversible motor means for rotation in one direction or the other when the opposed alternating potentials impressed on the input terminals of said first mentioned valve are unequal.

17. A system for the automatic control of a variable characteristic having adjusting means for controlling the value thereof comprising a normally stabilized alternating current energized control network, means to render said control network unstable proportionally to deviations of the characteristic from the desired value, means to derive an alternating potential from said network of magnitude determined by the value of said characteristic, reversible motor means to operate said adjusting means and to adjust said control network to reduce the instability, means to derive a second alternating potential from said network of magnitude determined by the adjustment of said adjusting means, electronic amplifier means to regulate the operation of said reversible motor means, said electronic amplifier means including an electronic valve having input terminals and output terminals, means to impress said first mentioned alternating potential on said input terminals, means to impress an alternating potential on said input terminals in opposition to said first mentioned alternating potential including a variable gain electronic valve having output terminals which are coupled to the input terminals of said first mentioned electronic valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, an electrical reactance, a connection including said reactance and the input terminals of said variable gain valve in series, means to impress said unidirectional potential on said connection including electrical reactance means to delay the application of changes in said unidirectional potential to said connection, and means coupled to the output terminals of said first mentioned electronic valve to energize said reversible motor means for rotation in one direction or the other when the opposed alternating potentials impressed on the input terminals of said first mentioned valve are unequal.

18. A system for the automatic control of a variable characteristic having adjusting means for controlling the value thereof comprising a normally stabilized control network having a control slidewire resistance and slide contact and a follow-up slidewire resistance and slide contact, means to adjust said control slide contact along said control slidewire resistance proportionally to deviations of the characteristic from the desired value, means to derive an alternating potential from said network of magnitude determined by the position of said control contact along said control slidewire resistance, reversible motor means to operate said adjusting means and to adjust said follow-up slide contact along said follow-up slidewire resistance, means to derive a second alternating potential from said network of magnitude determined by the position of said follow-up contact along said follow-up slidewire resistance, electronic amplifier means to regulate the operation of said reversible motor means, said electronic amplifier means including electronic valve means having input terminals and output terminals, means to impress said first mentioned alternating potential on said input terminals, means to impress an alternating potential on said input terminals in opposition to said first mentioned alternating potential including a variable gain electronic valve having an output circuit which is coupled to the input terminals of said first mentioned electronic valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, and means coupled to the output terminals of said electronic valve means to energize said reversible motor for rotation in one direction or the other when the opposed alternating potentials impressed on the input terminals of said electronic valve means are unequal.

19. A system for the automatic control of a variable characteristic having adjusting means for controlling the value thereof comprising a normally stabilized control network, means to render said control network unstable proportionally to deviations of the characteristic from the desired value, means to derive an alternating potential from the said network of magnitude determined by the value of said characteristic, reversible motor means to operate said adjusting means and to adjust said control network to reduce the instability, means to derive a second alternating potential from said network of magnitude determined by the adjustment of said adjusting means, electronic amplifier means to regulate the operation of said reversible motor means, said electronic amplifier means including electronic valve means having input terminals and output terminals, means to impress said first mentioned alternating potential on said input terminals, means to impress an alternating potential on said input terminals in opposition to said first mentioned alternating potential including a variable gain electronic valve having an output circuit which is coupled to the input terminals of said first mentioned electronic valve and also having input terminals, means to impress an alternating potential of predetermined magnitude on the input terminals of said variable gain valve, means to impress a unidirectional potential on the input terminals of said variable gain valve to vary the gain of the latter comprising means to rectify said second mentioned alternating potential to produce a unidirectional potential of magnitude varying in accordance with the magnitude of said second mentioned alternating potential, and means coupled to the output terminals of said electronic valve means to energize said reversible motor for rotation in one direction or the other when the opposed alternating potentials impressed on the input terminals of said electronic valve means are unequal.

WILLIAM L. SHAFFER.